(12) United States Patent
Myung et al.

(10) Patent No.: US 10,938,029 B2
(45) Date of Patent: Mar. 2, 2021

(54) SODIUM-BASED ELECTRODE ACTIVE MATERIAL AND SECONDARY BATTERY COMPRISING SAME

(71) Applicant: INDUSTRY-ACADEMIA COOPERATION GROUP OF SEJONG UNIVERSITY, Seoul (KR)

(72) Inventors: Seungtaek Myung, Seoul (KR); Jiung Choi, Seoul (KR); Changheum Jo, Seoul (KR)

(73) Assignee: INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 194 days.

(21) Appl. No.: 16/093,042

(22) PCT Filed: Apr. 12, 2017

(86) PCT No.: PCT/KR2017/003981
§ 371 (c)(1),
(2) Date: Mar. 18, 2019

(87) PCT Pub. No.: WO2017/179917
PCT Pub. Date: Oct. 19, 2017

(65) Prior Publication Data
US 2019/0207213 A1    Jul. 4, 2019

(30) Foreign Application Priority Data

Apr. 12, 2016 (KR) .......... 10-2016-0045097
Apr. 12, 2017 (KR) .......... 10-2017-0047609
Apr. 12, 2017 (KR) .......... 10-2017-0047610

(51) Int. Cl.
*H01M 4/505* (2010.01)
*H01M 10/054* (2010.01)
(Continued)

(52) U.S. Cl.
CPC .............. *H01M 4/505* (2013.01); *C01D 1/02* (2013.01); *C01G 45/1228* (2013.01);
(Continued)

(58) Field of Classification Search
None
See application file for complete search history.

(56) References Cited

U.S. PATENT DOCUMENTS

2012/0305855 A1   12/2012 Kim et al.
2018/0166686 A1*   6/2018 Kumakura .......... H01M 10/054

FOREIGN PATENT DOCUMENTS

KR    10-2012-0133300 A    12/2012

* cited by examiner

*Primary Examiner* — Victoria H Lynch
(74) *Attorney, Agent, or Firm* — Sughrue Mion, PLLC

(57) ABSTRACT

A sodium-based electrode active material and a secondary battery comprising the same are provided. The electrode active material is represented by the following Chemical Formula 1, and has an orthorhombic crystal system and a space group of Cmcm. [Chemical Formula 1] $Na_x[Mn_{1-y-z}M^1{}_yM^2{}_z]O_{2-\alpha}A_\alpha$. In Chemical Formula 1, x may be 0.5 to 0.8. $M^1$ and $M^2$ may be, regardless of each other, Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi. y may be from 0 to 0.25. z may be from 0 to 0.25. A may be N, O, F, or S, and α may be 0 to 0.1.

18 Claims, 32 Drawing Sheets

Preparing metal salt solution containing sodium salt and manganese salt — S10

Obtaining solid powder by subjecting the metal salt solution to ultrasonic spray pyrolysis — S20

Obtaining cathode active material by heat-treating the solid powder in air atmosphere — S30

(51) Int. Cl.
*C01D 1/02* (2006.01)
*H01M 4/04* (2006.01)
*C01G 45/12* (2006.01)
*C01G 49/00* (2006.01)
*C01G 51/00* (2006.01)
*H01M 10/0568* (2010.01)
*C01G 53/00* (2006.01)
*H01M 4/02* (2006.01)

(52) U.S. Cl.
CPC ......... *C01G 49/0072* (2013.01); *C01G 51/50* (2013.01); *C01G 53/50* (2013.01); *H01M 4/0471* (2013.01); *H01M 10/054* (2013.01); *H01M 10/0568* (2013.01); *C01P 2002/52* (2013.01); *C01P 2002/72* (2013.01); *C01P 2002/74* (2013.01); *C01P 2004/90* (2013.01); *C01P 2006/40* (2013.01); *H01M 2004/021* (2013.01); *H01M 2004/028* (2013.01)

[FIG. 1]
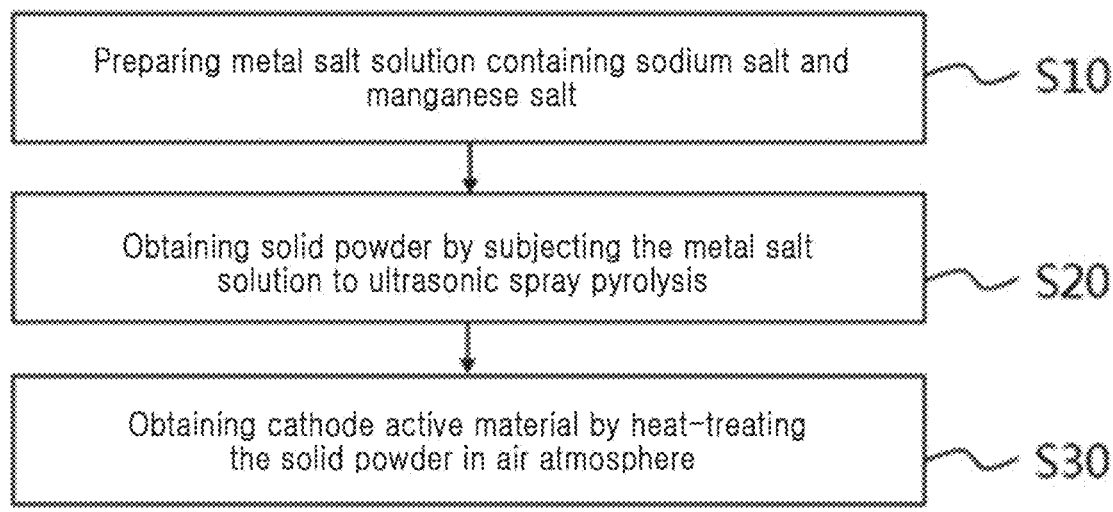
[FIG. 2]
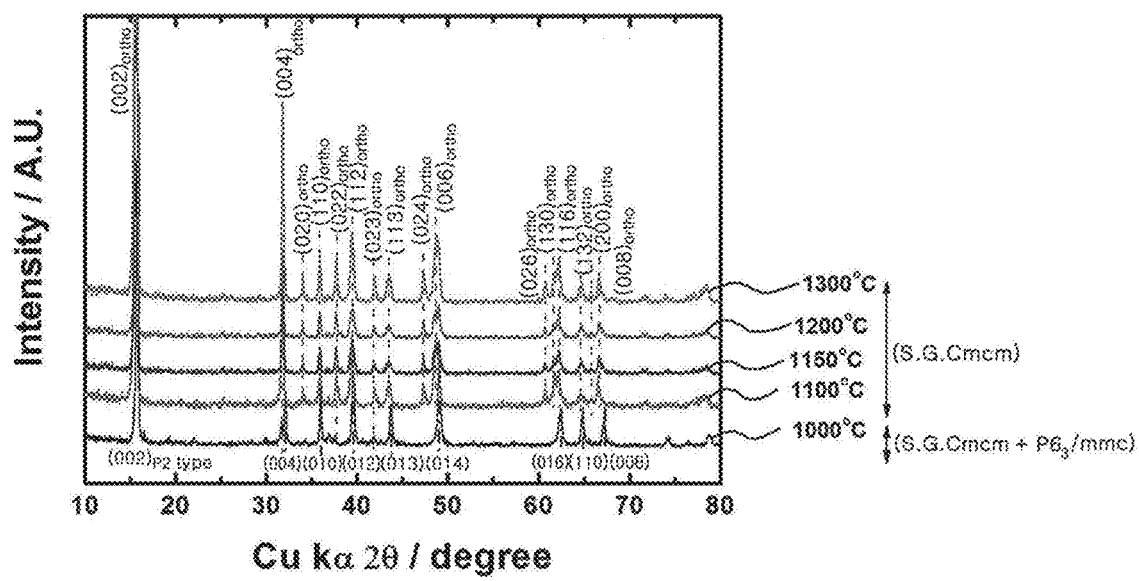

[FIG. 3]
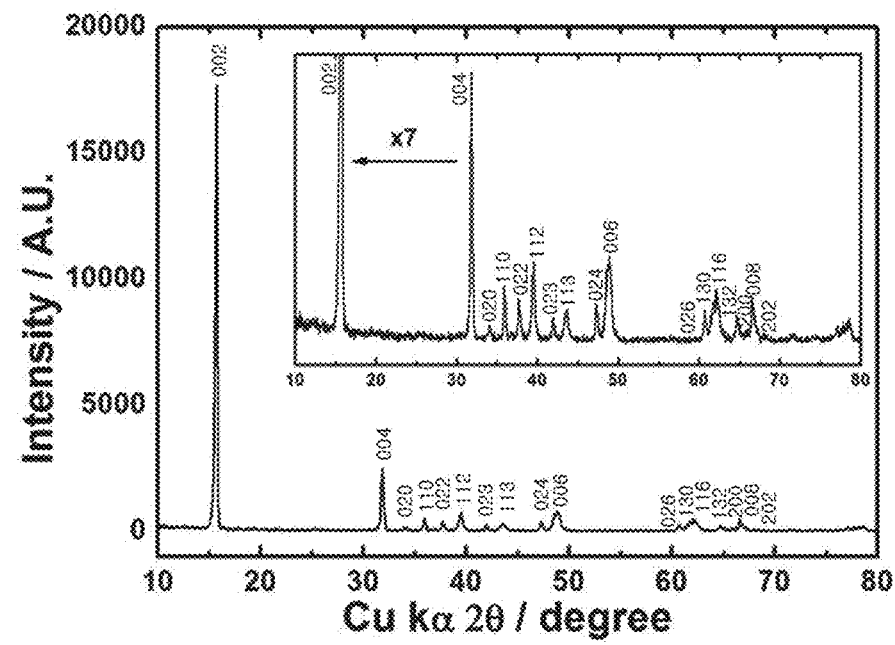
[FIG. 4]
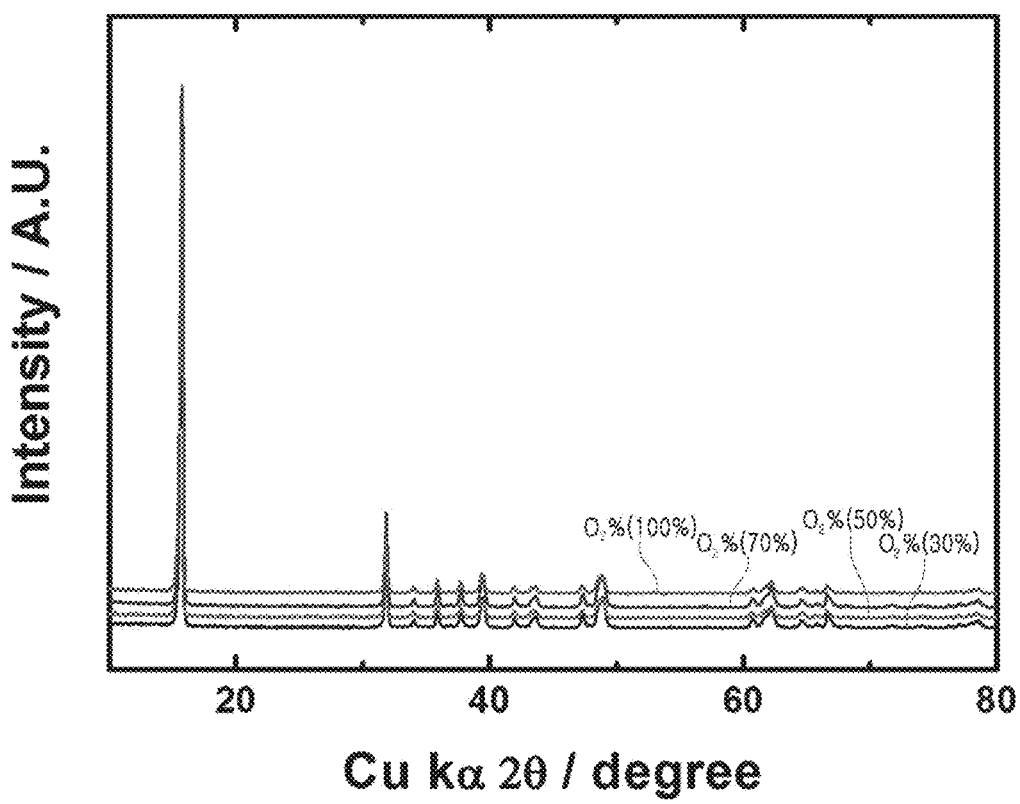

[FIG. 5]
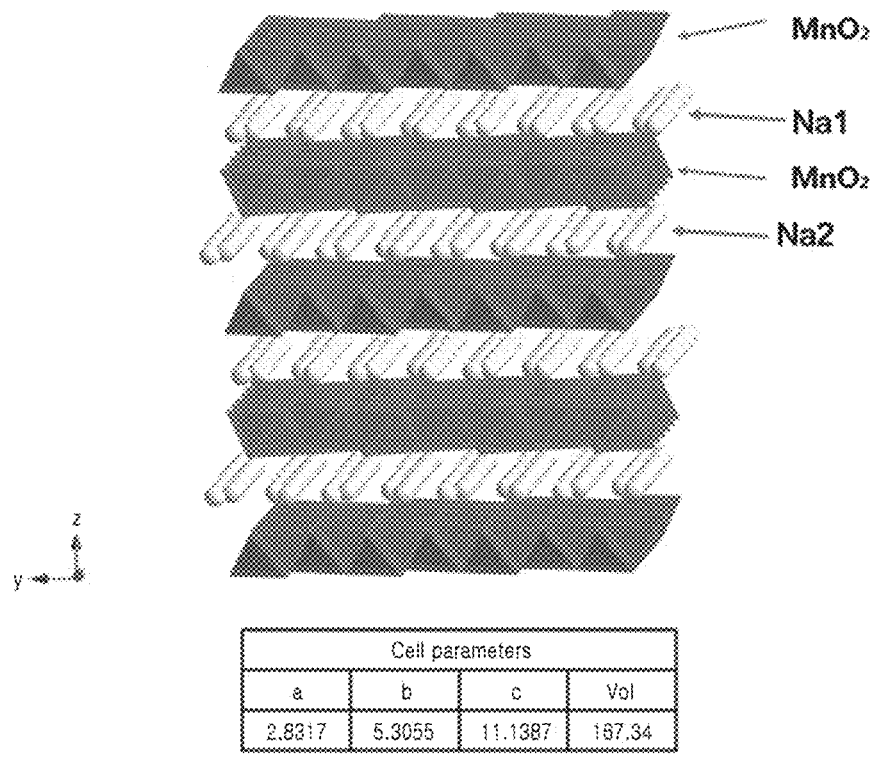
[FIG. 6]
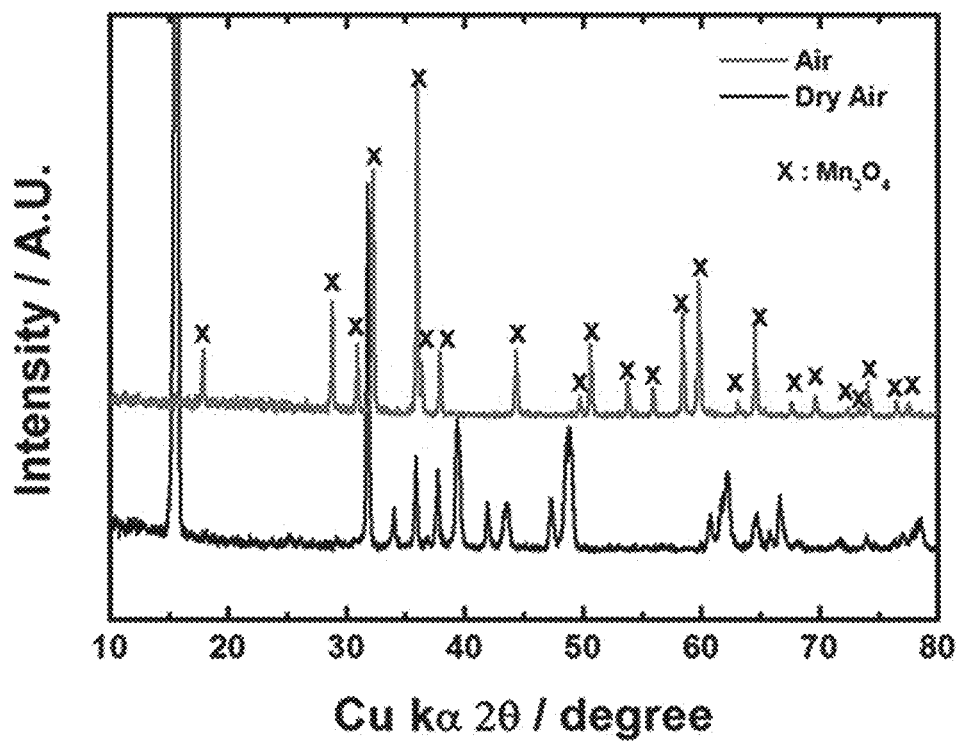

[FIG. 7]
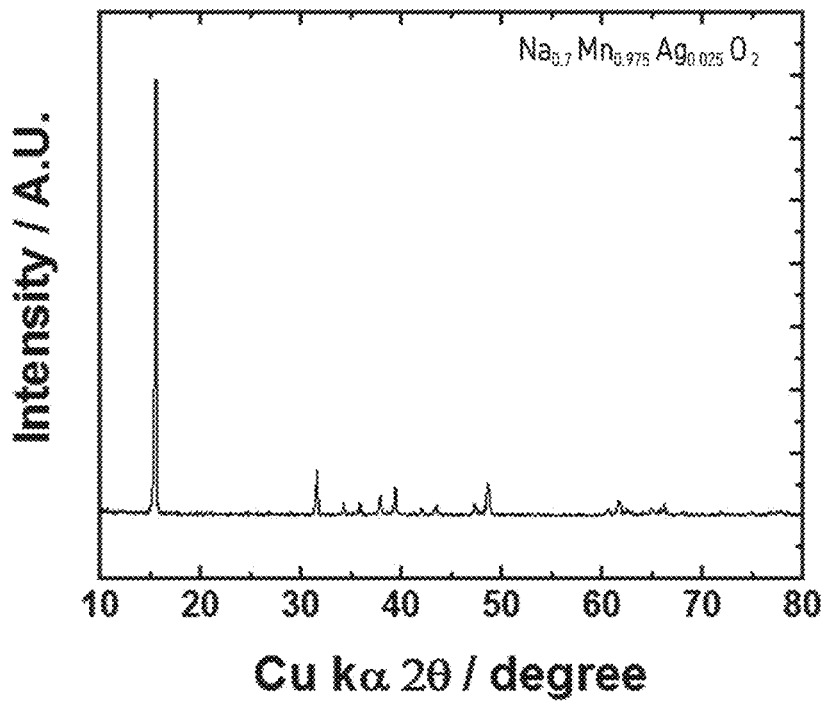
[FIG. 8]
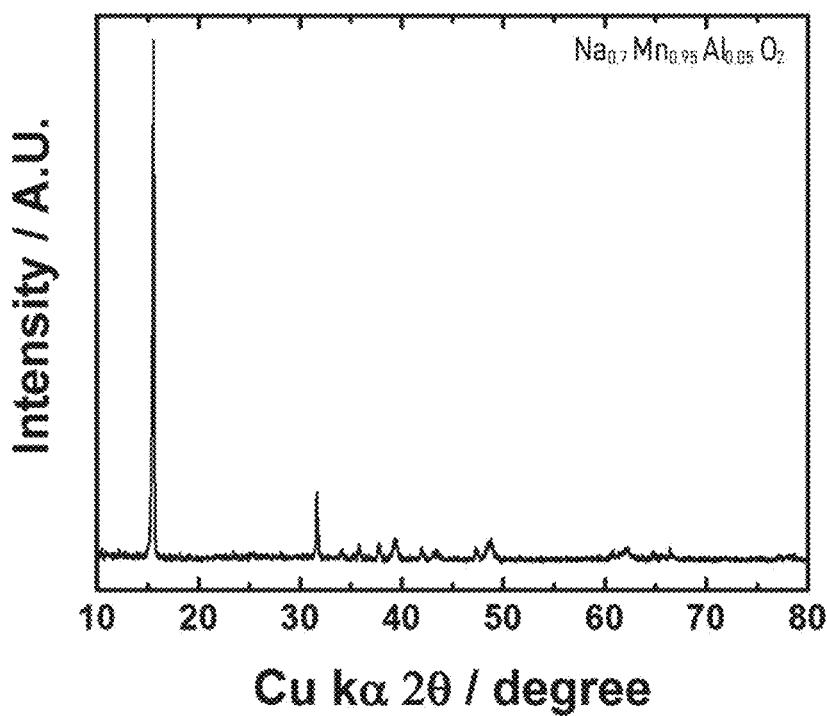

[FIG. 9]
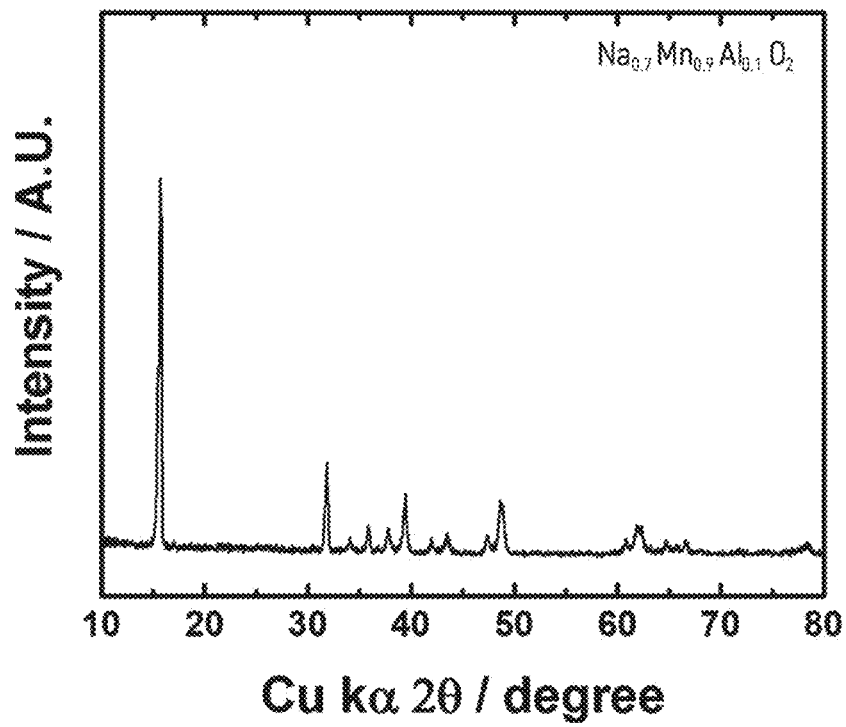
[FIG. 10]
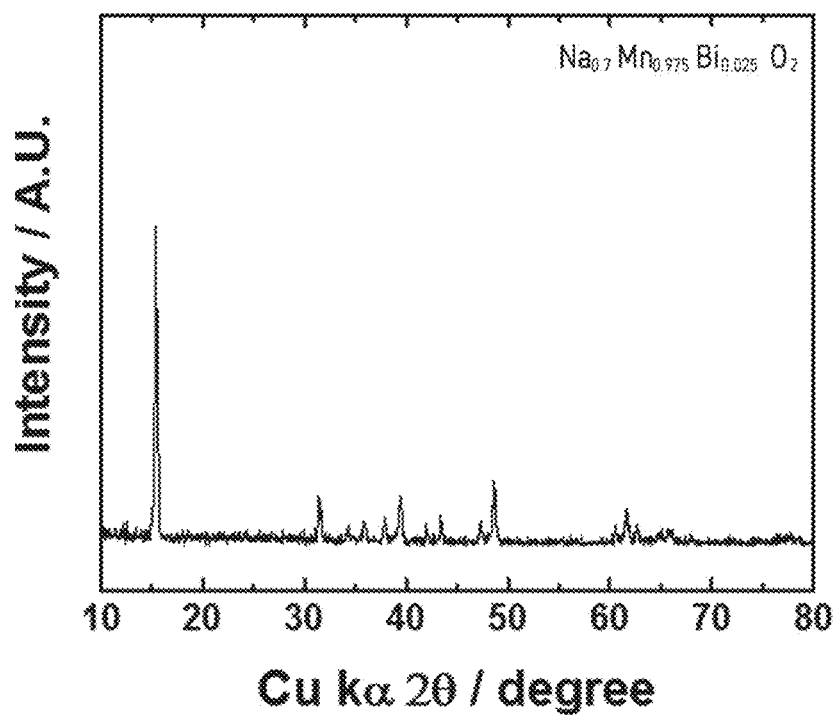

[FIG. 11]
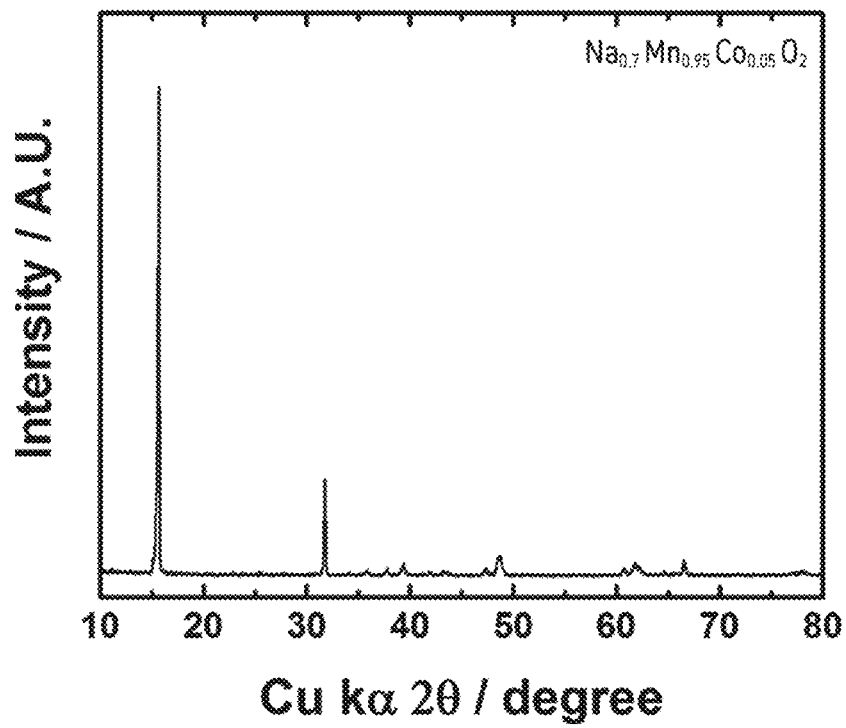
[FIG. 12]
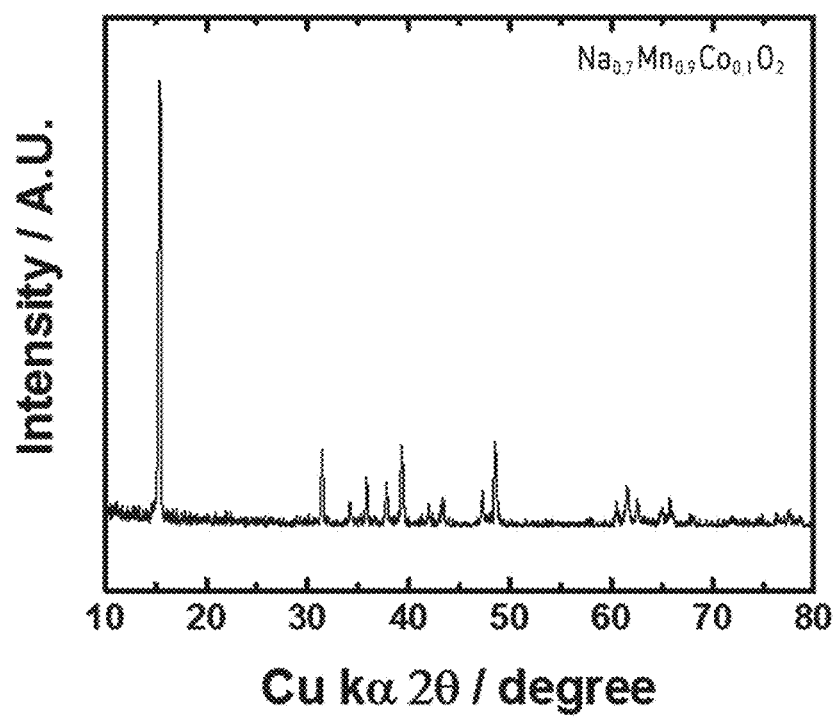

[FIG. 13]
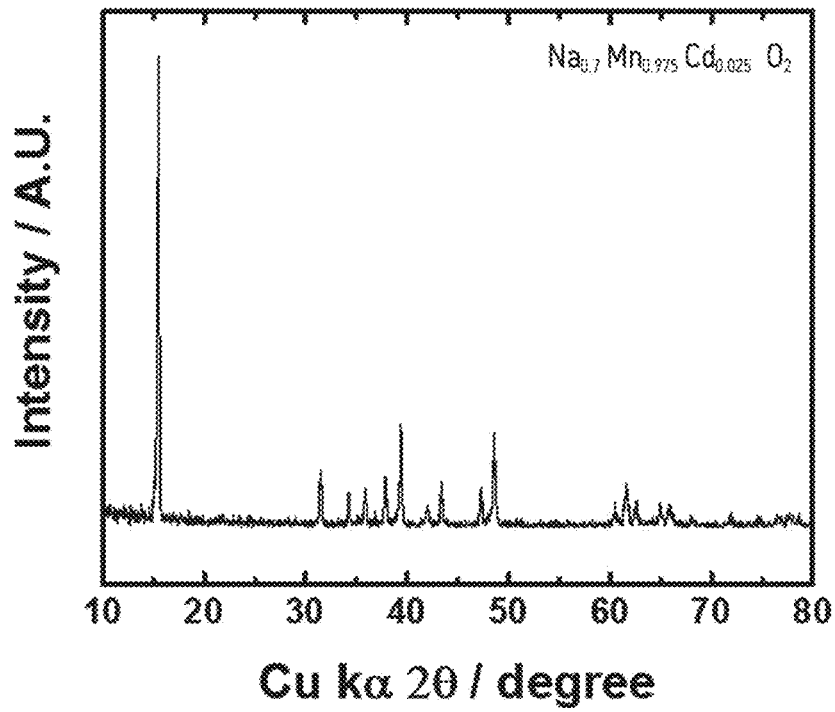
[FIG. 14]
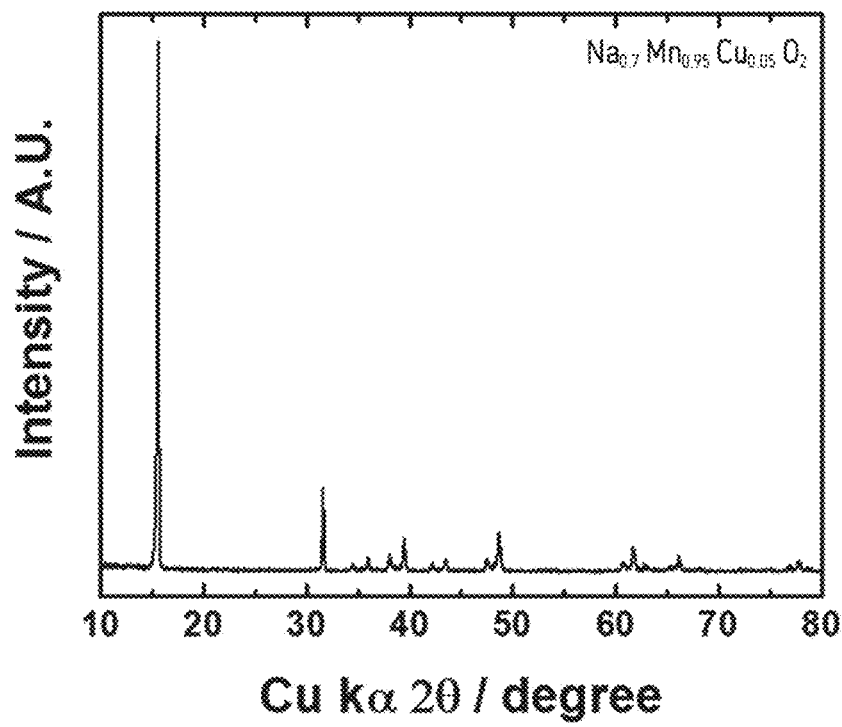

[FIG. 15]
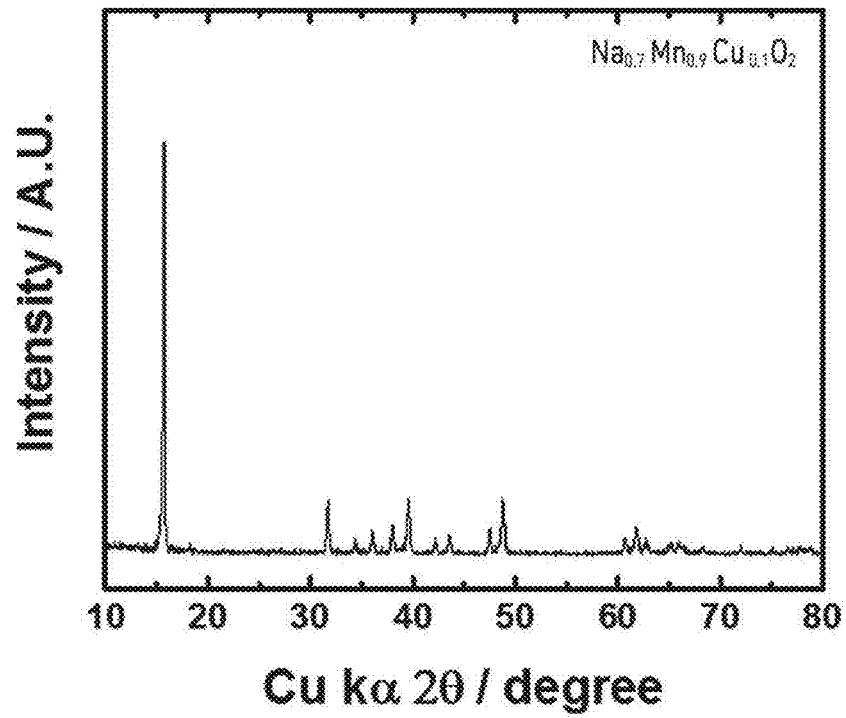
[FIG. 16]
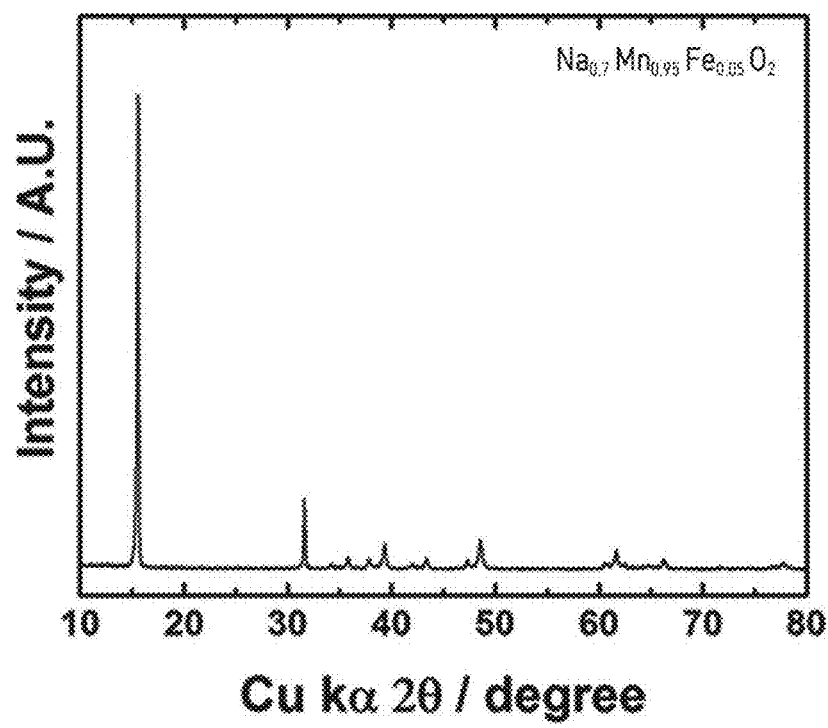

[FIG. 17]
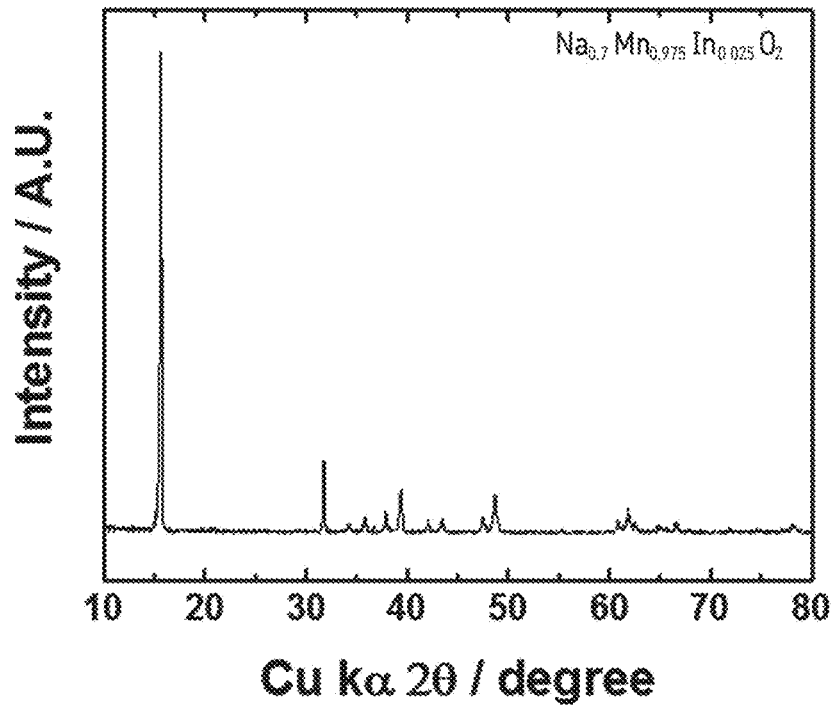
[FIG. 18]
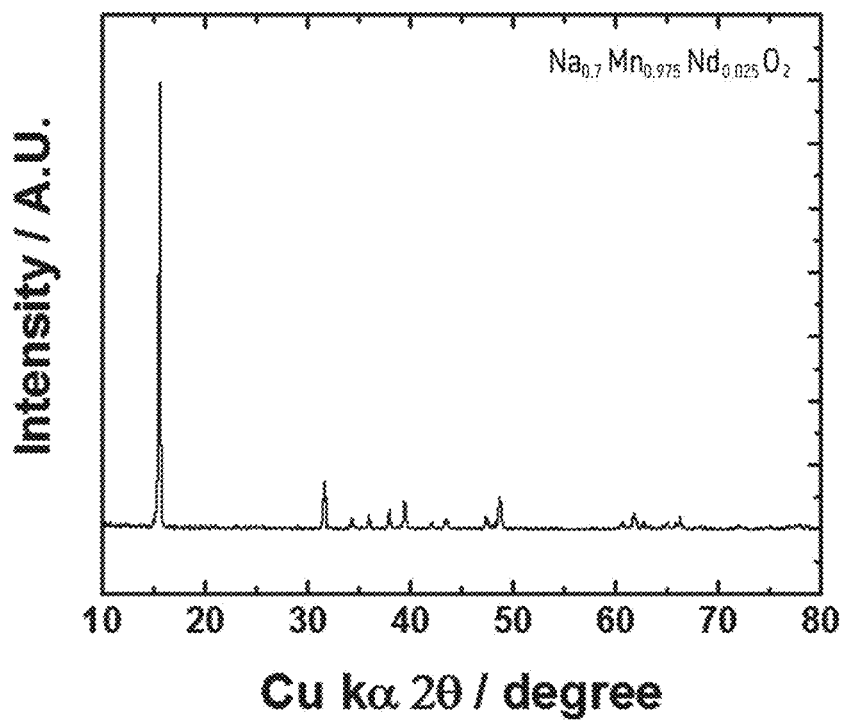

[FIG. 19]
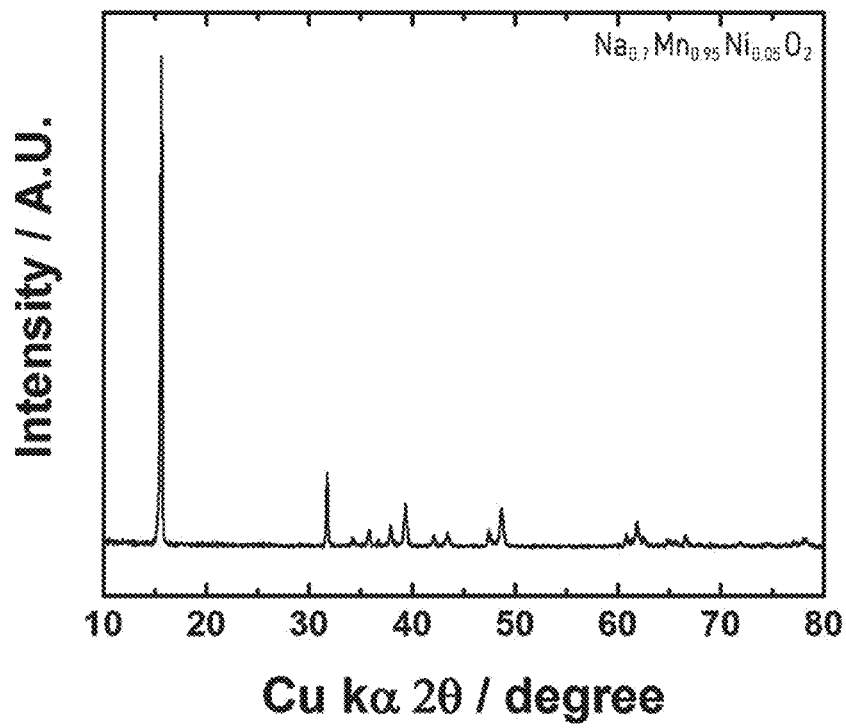
[FIG. 20]
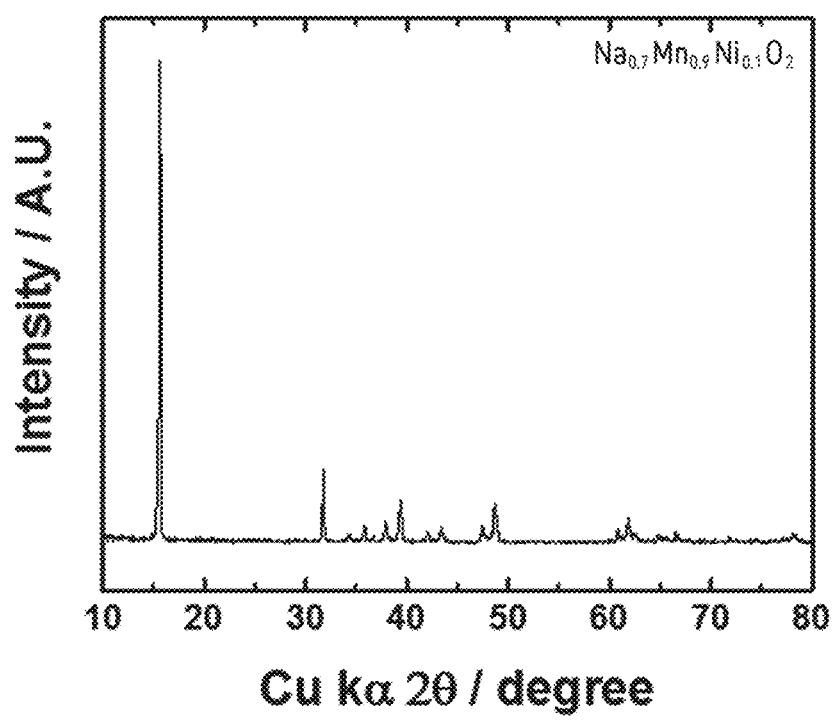

[FIG. 21]
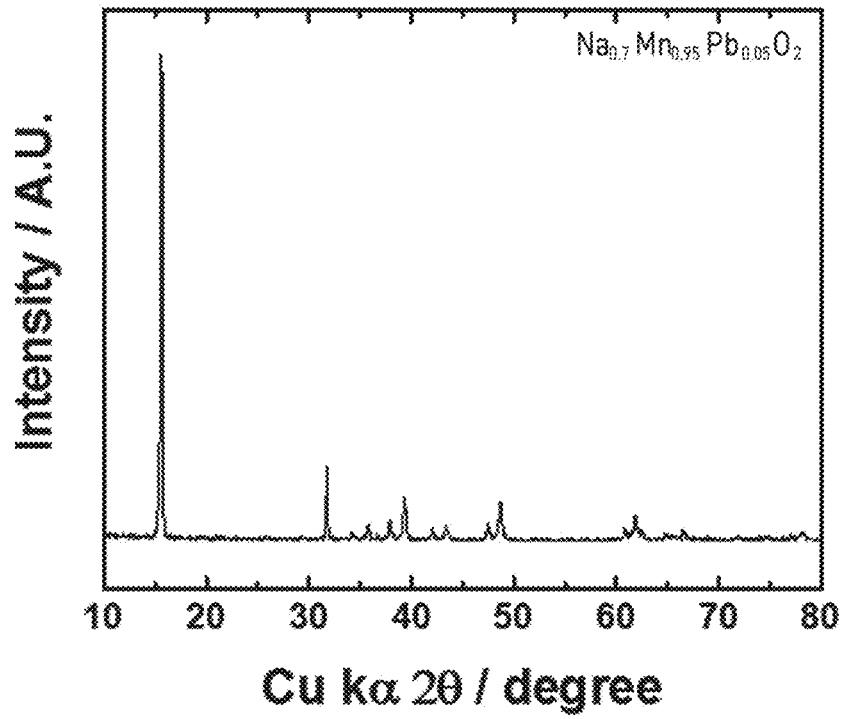
[FIG. 22]
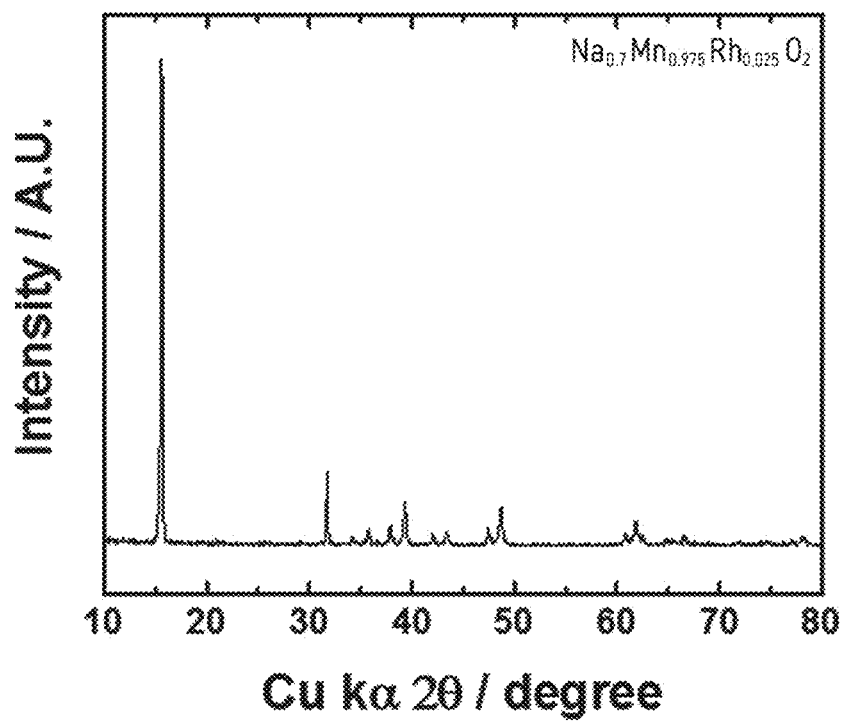

[FIG. 23]
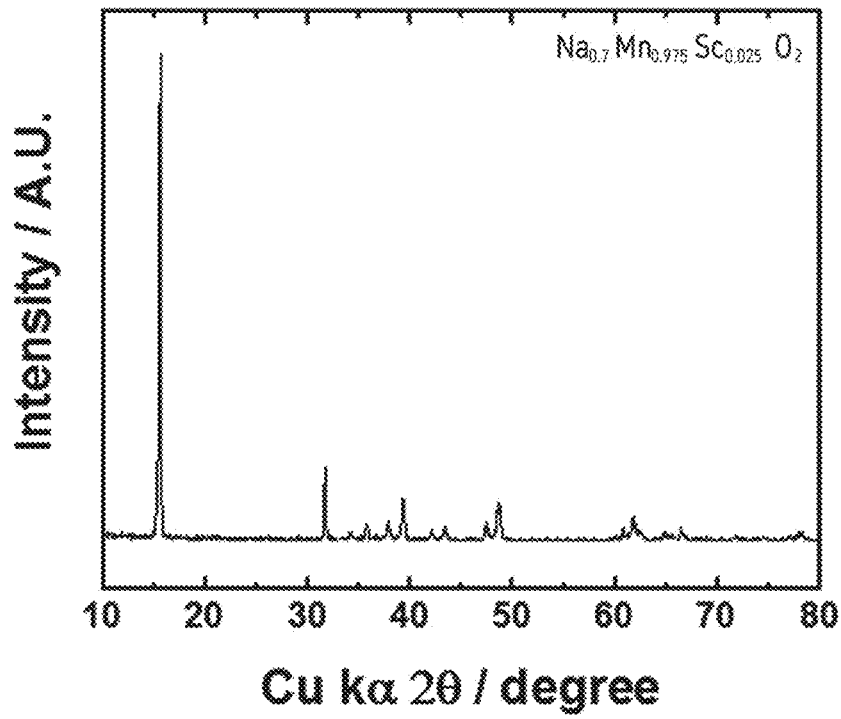
[FIG. 24]
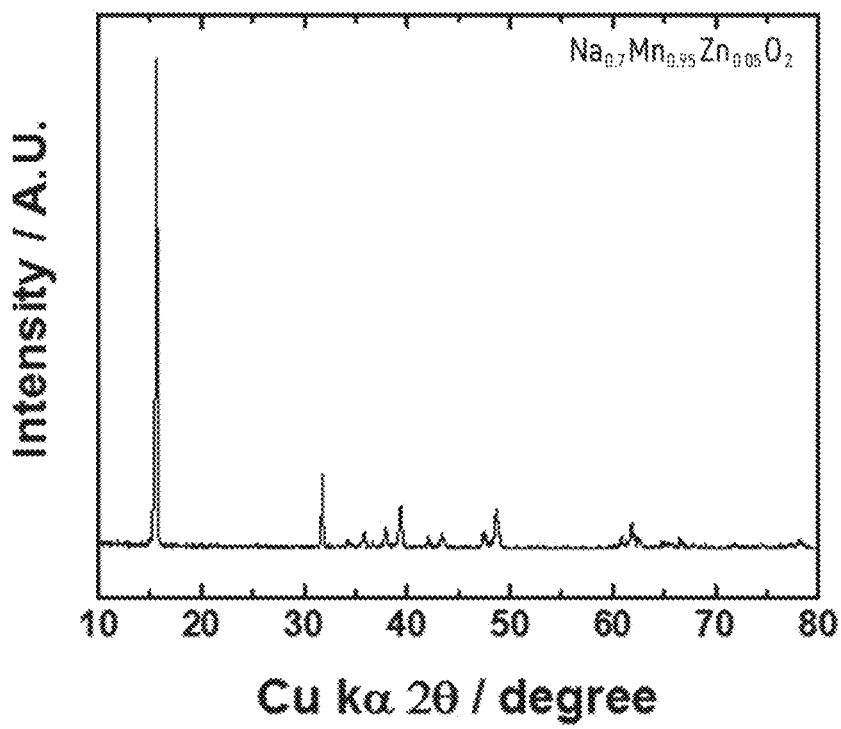

[FIG. 25]
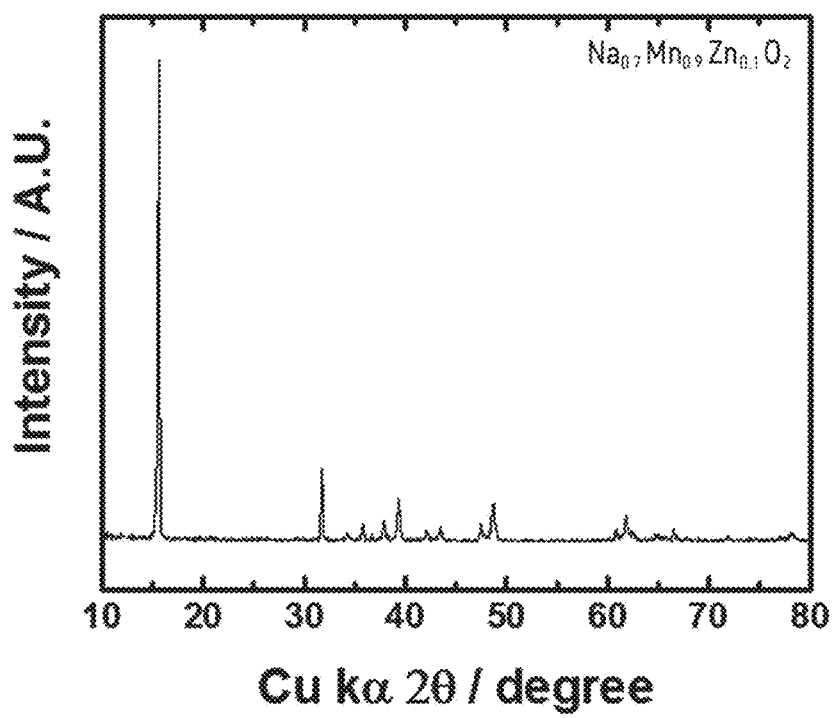
[FIG. 26A]
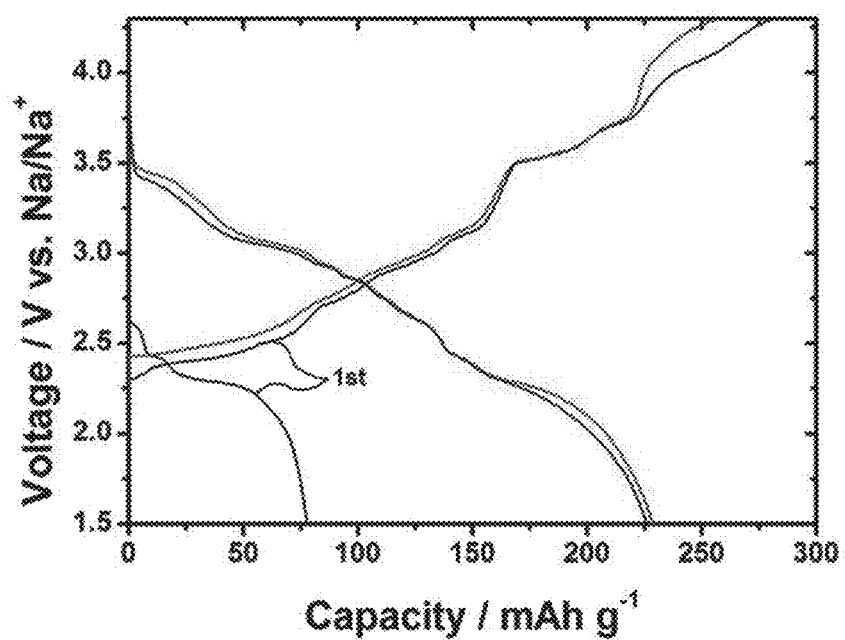

[FIG. 26B]
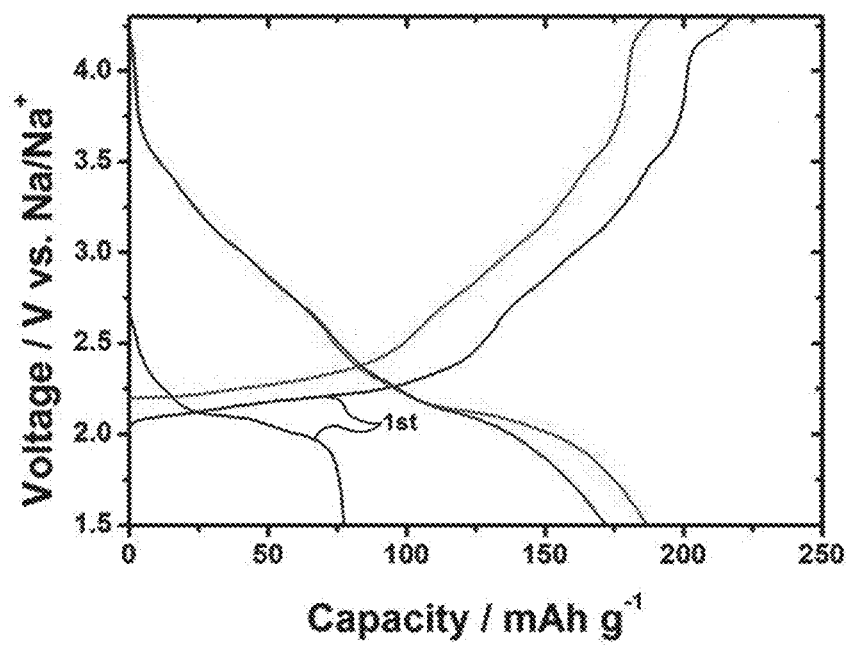
[FIG. 26C]
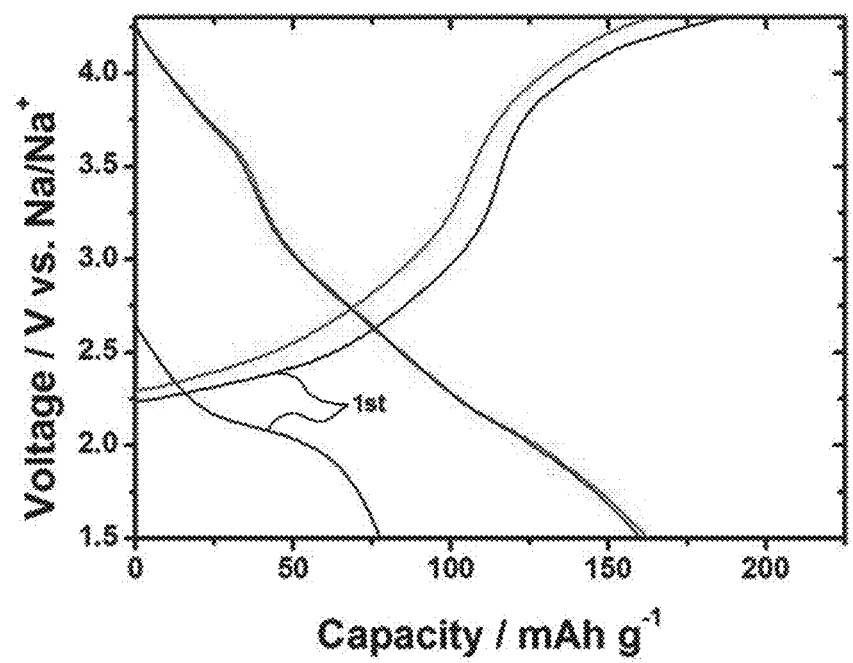

[FIG. 26D]
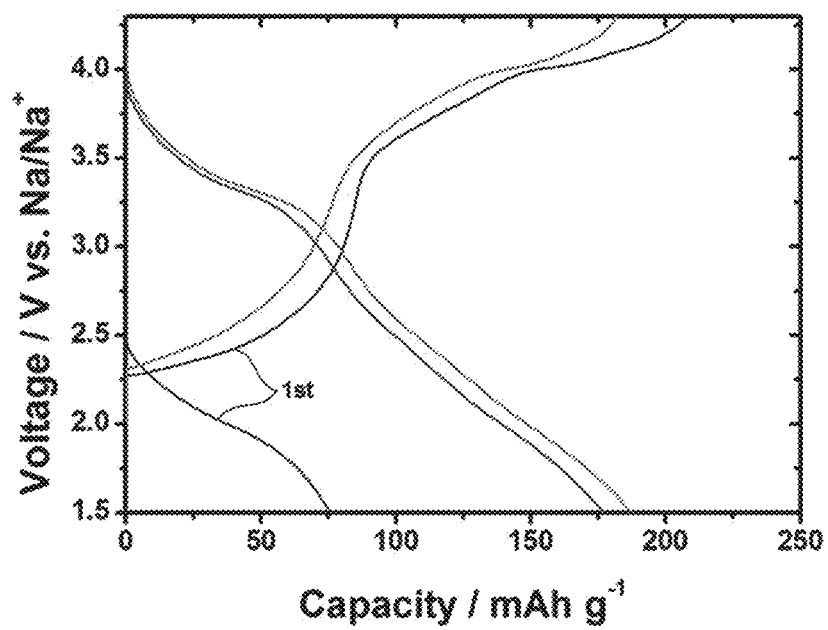
[FIG. 27A]
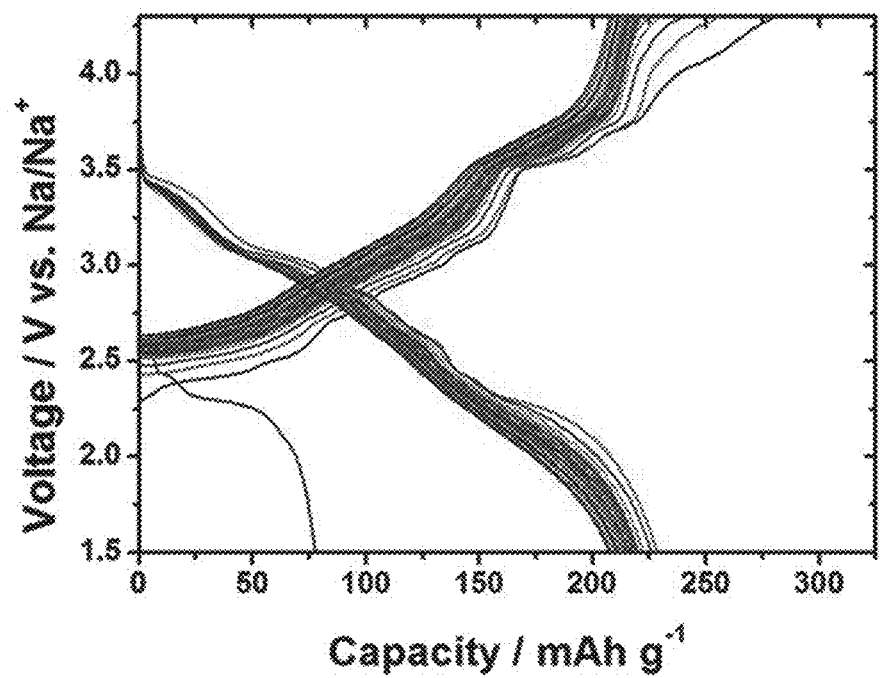

[FIG. 27B]
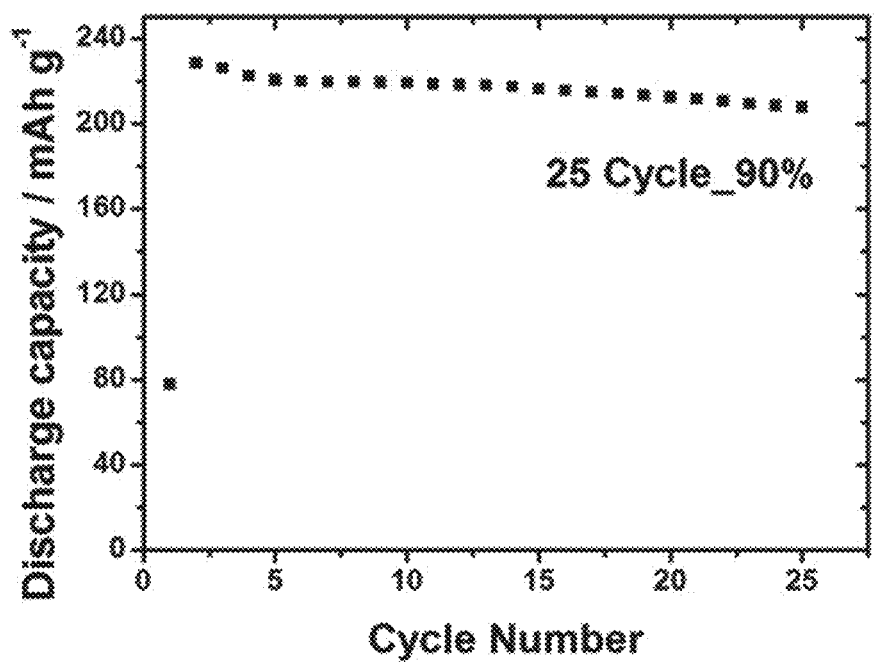
[FIG. 28]
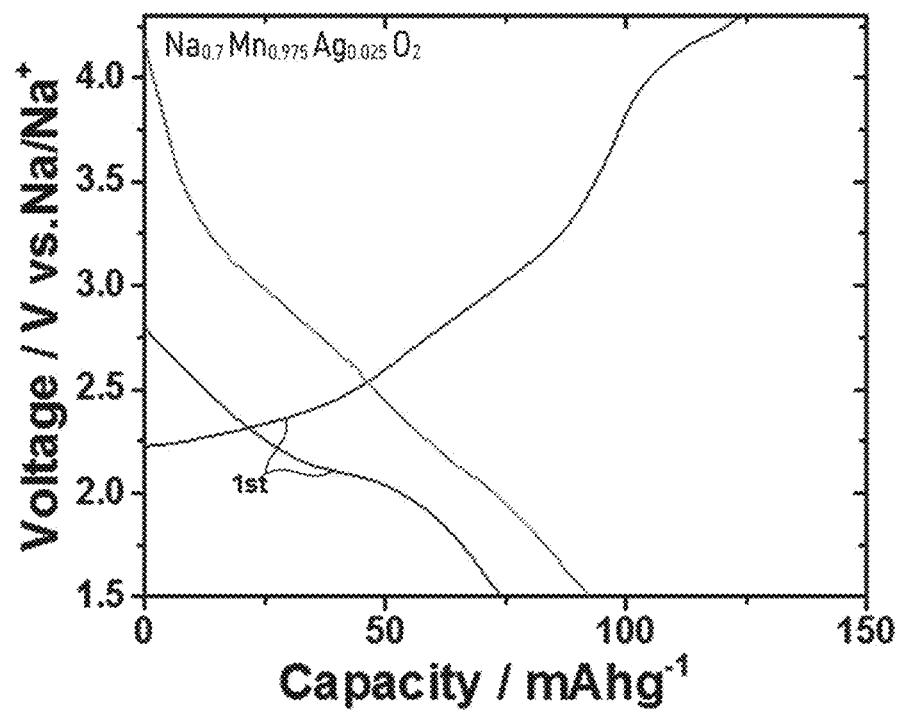

[FIG. 29]
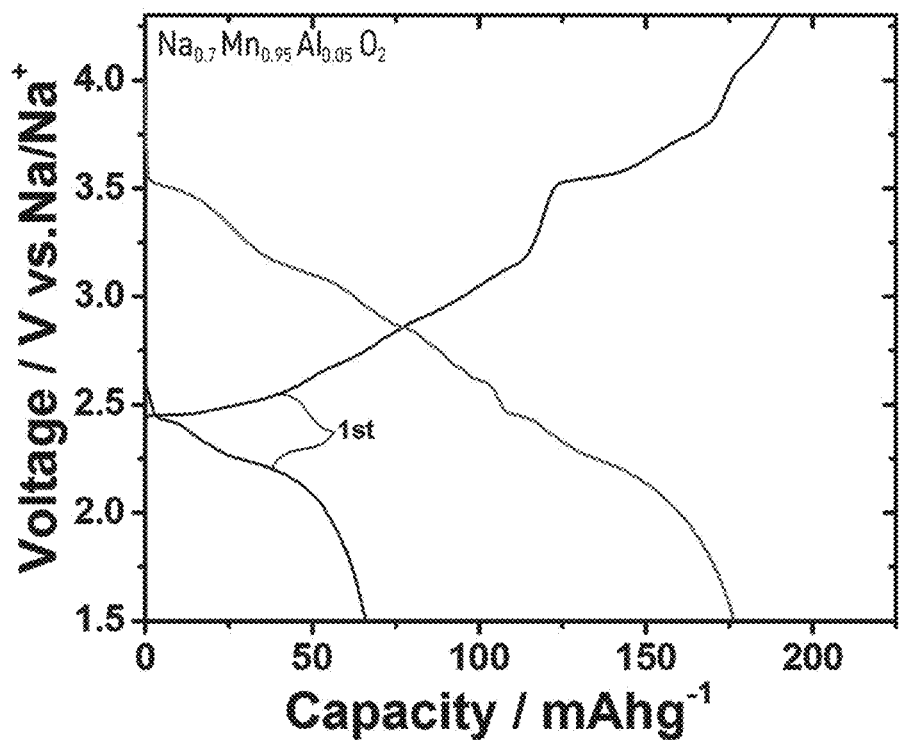
[FIG. 30]
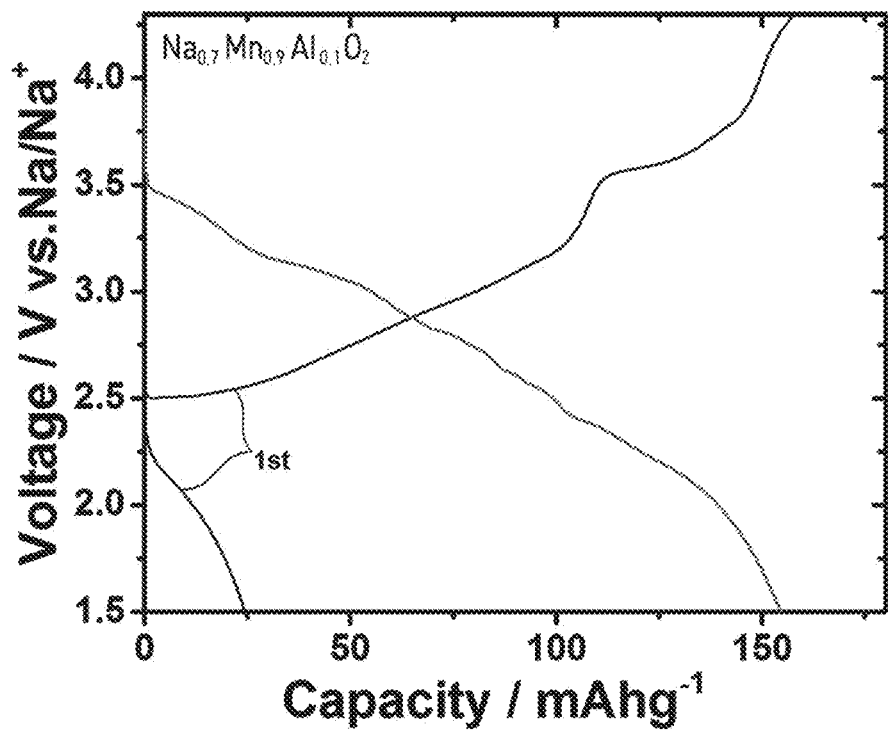

[FIG. 31]
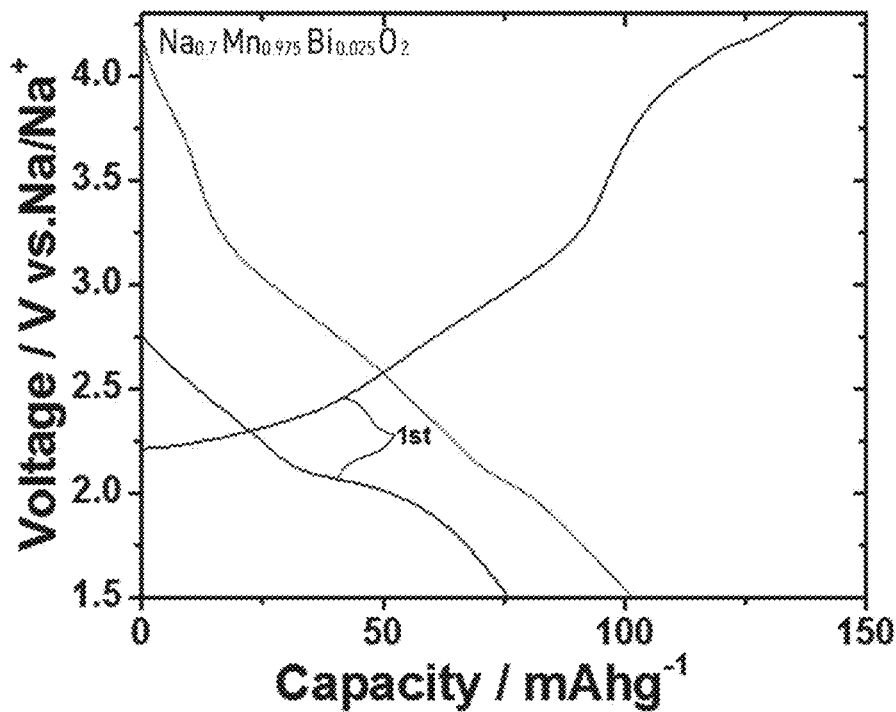
[FIG. 32]
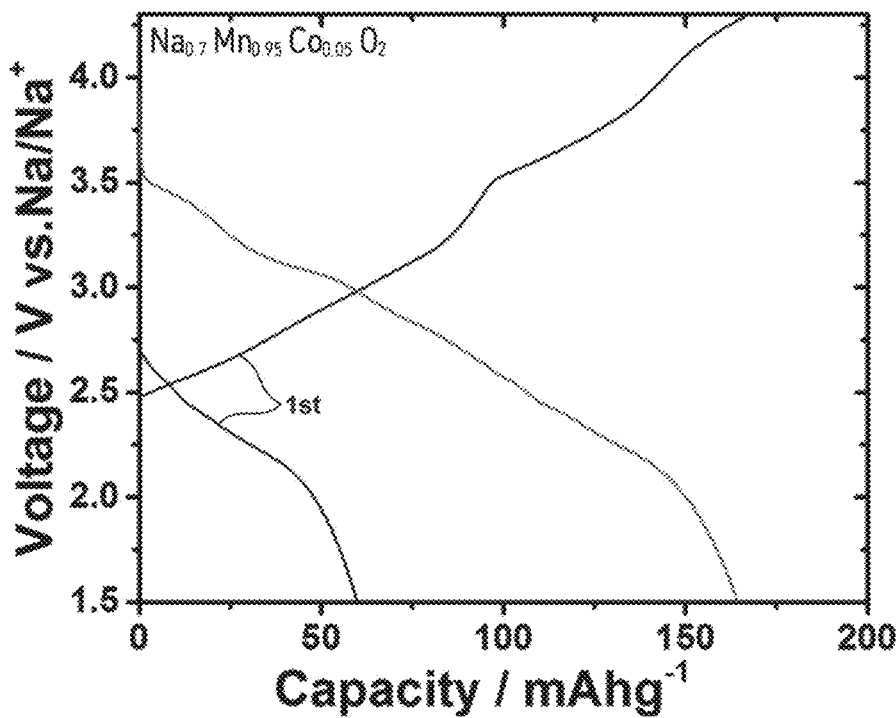

[FIG. 33]
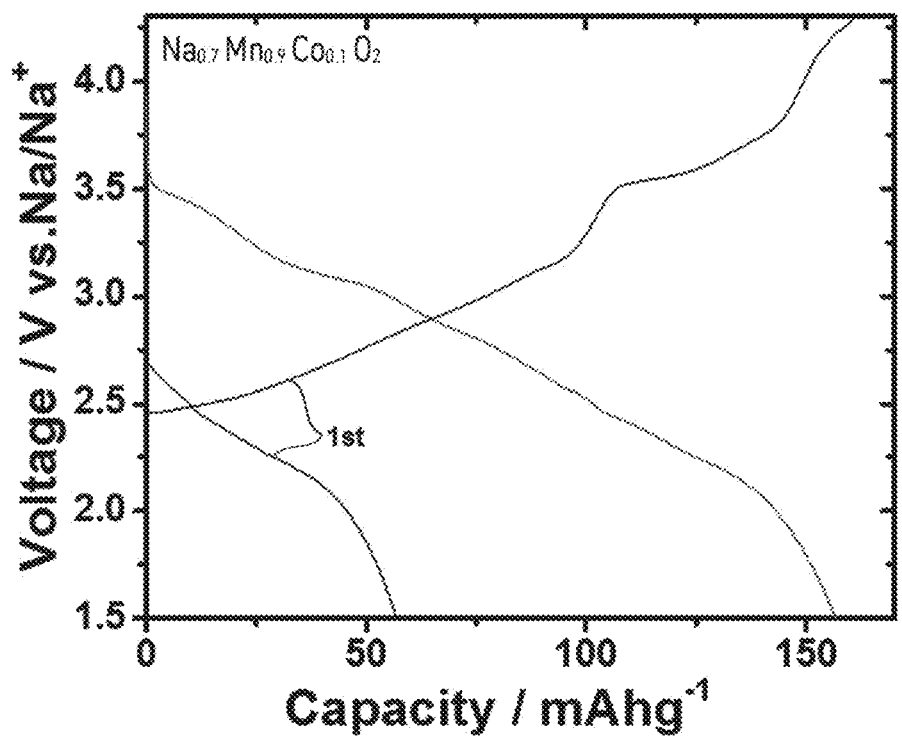
[FIG. 34]
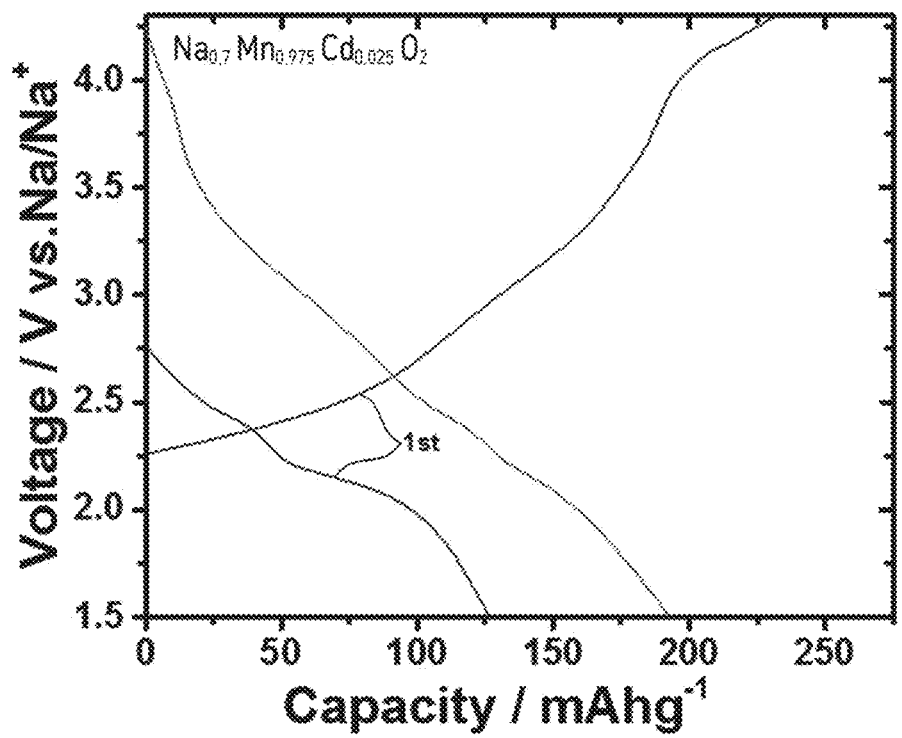

[FIG. 35]
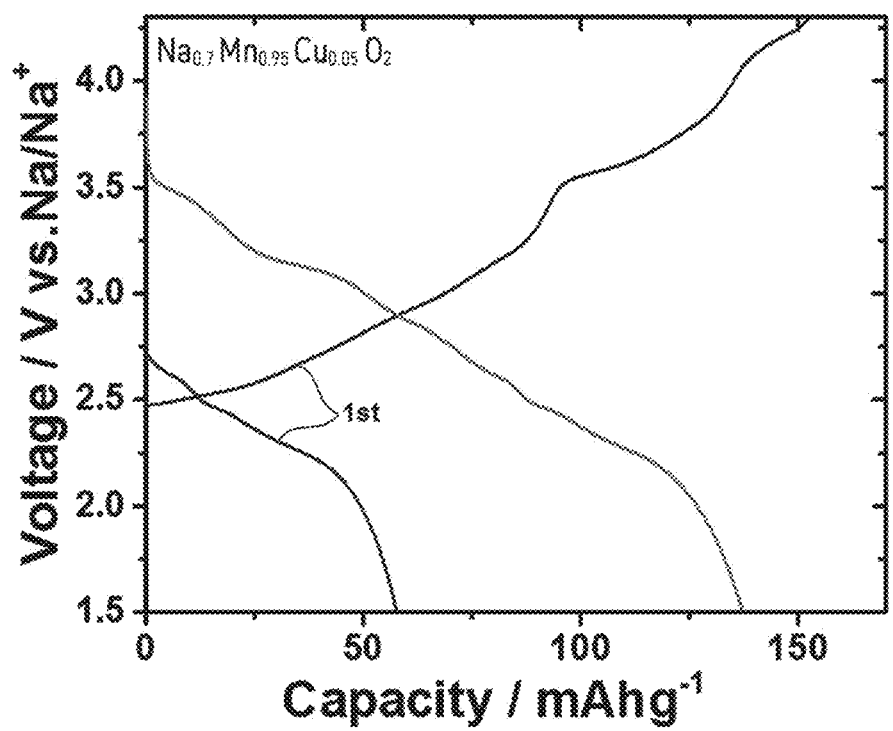
[FIG. 36]
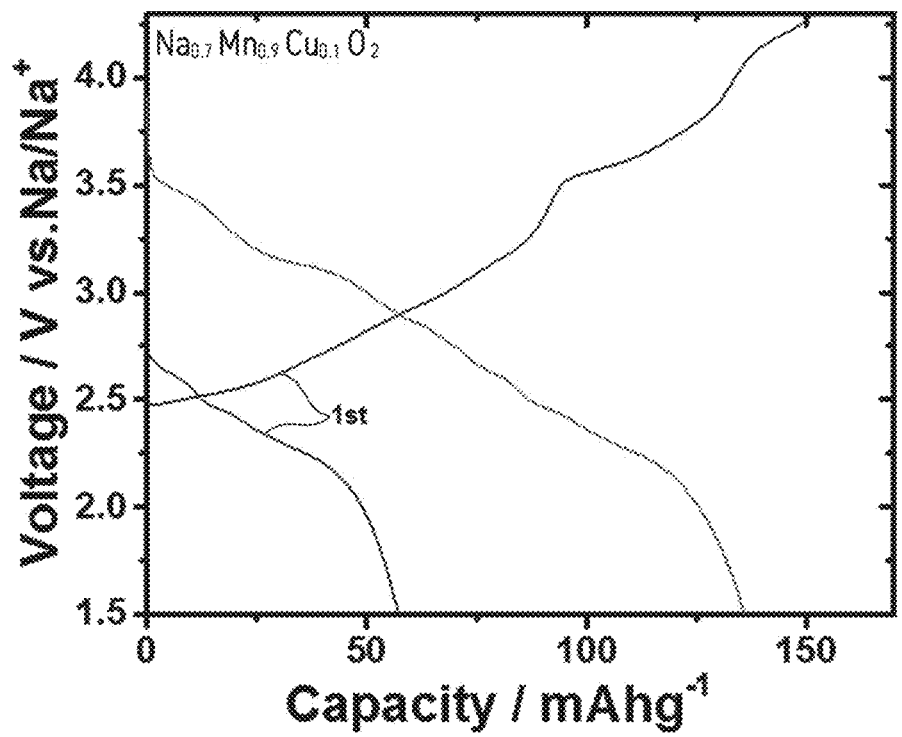

[FIG. 37]
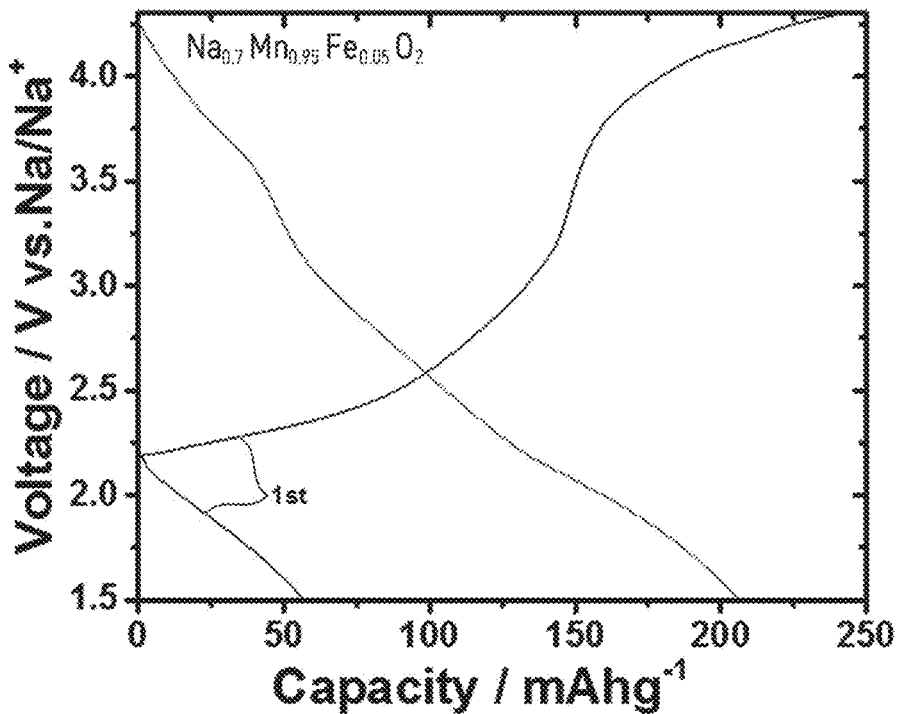
[FIG. 38]
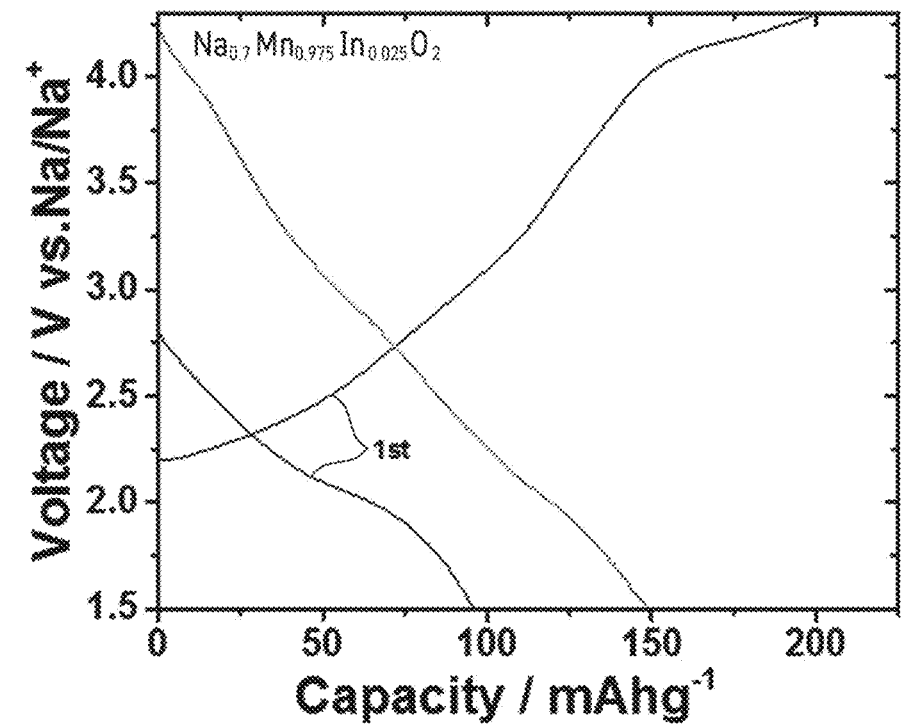

[FIG. 39]
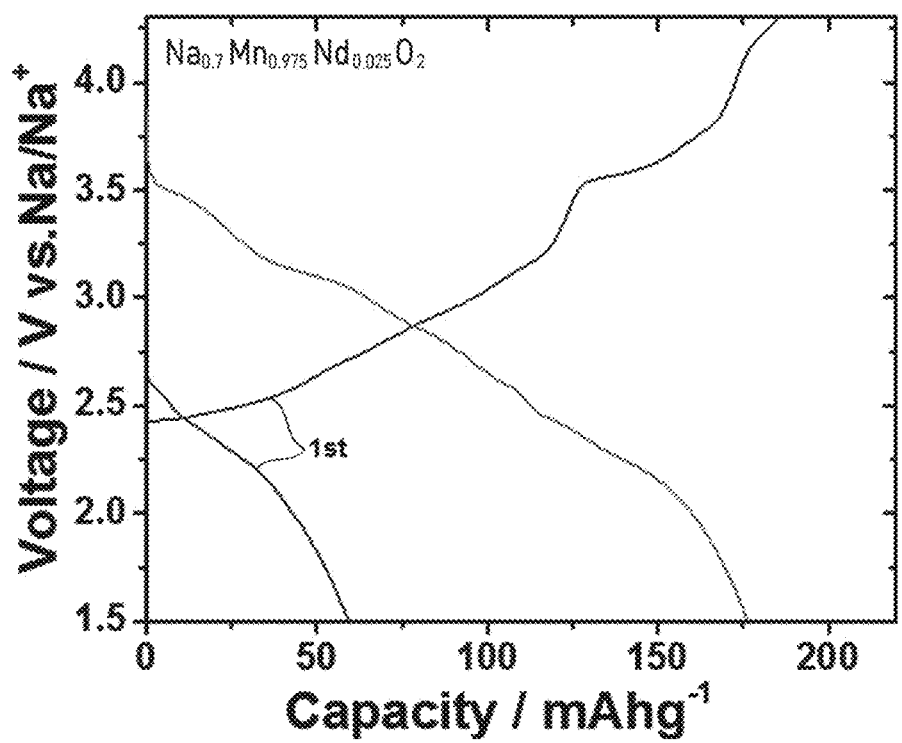
[FIG. 40]
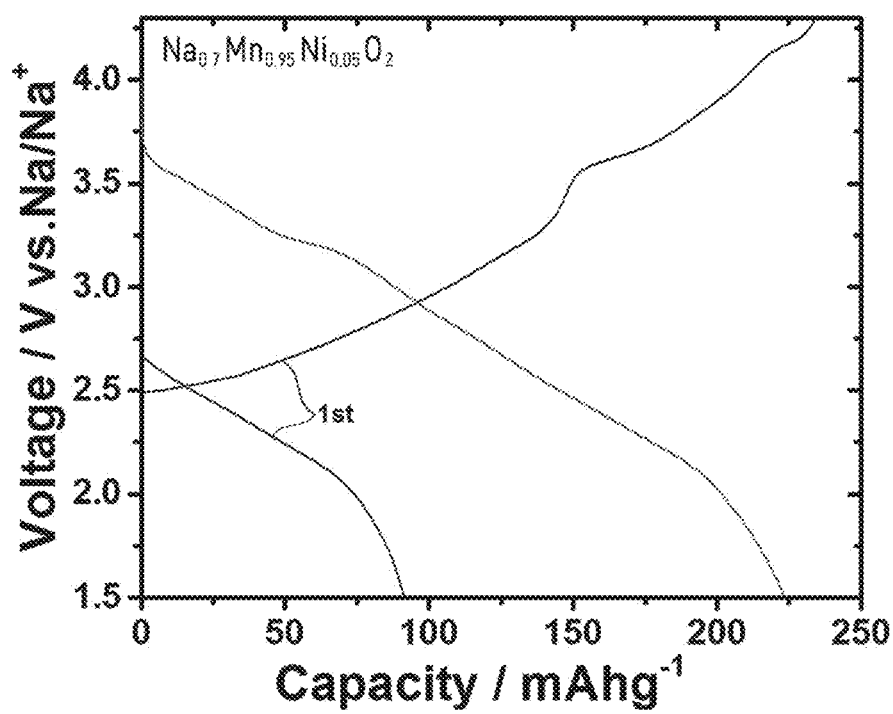

[FIG. 41]
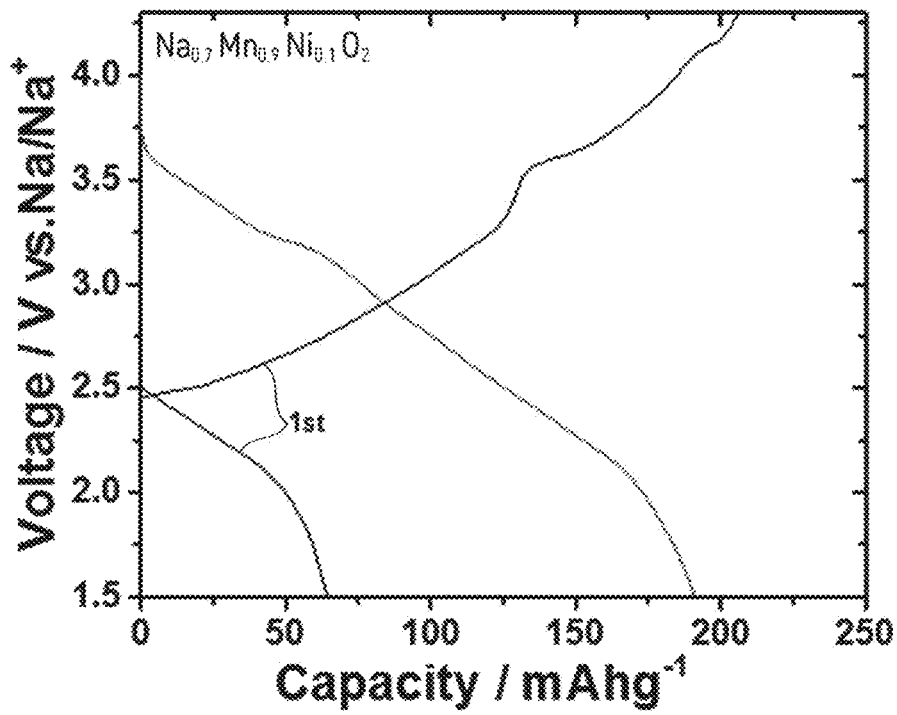
[FIG. 42]
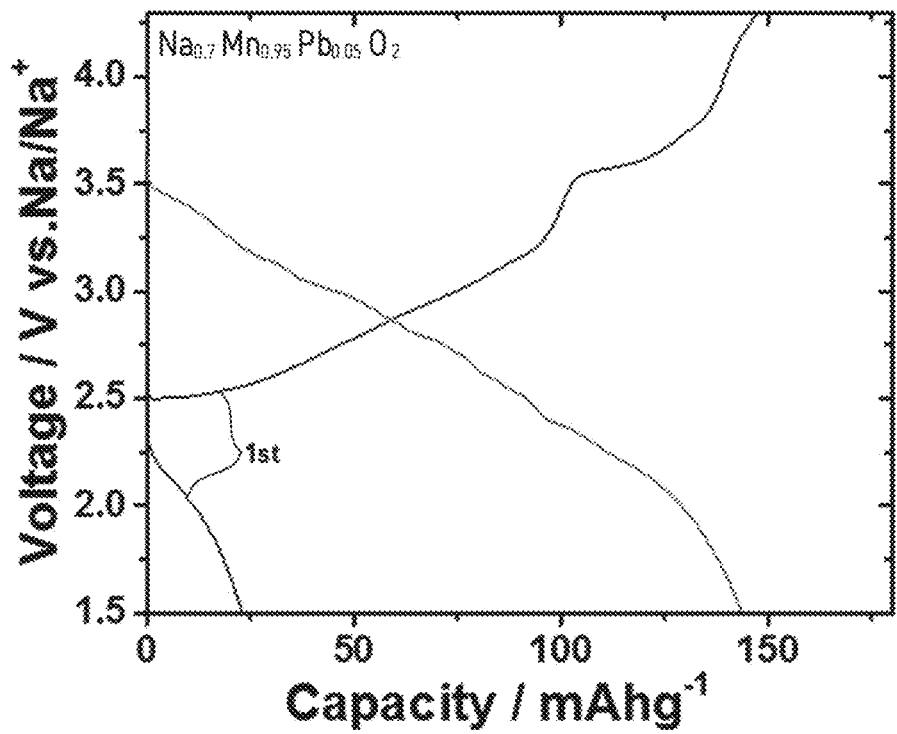

[FIG. 43]
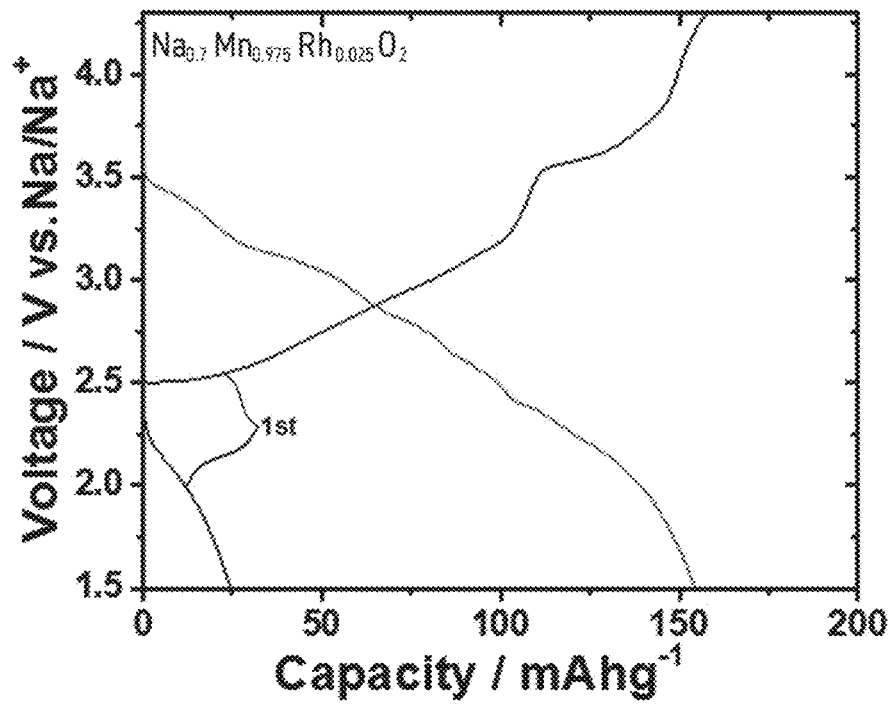
[FIG. 44]
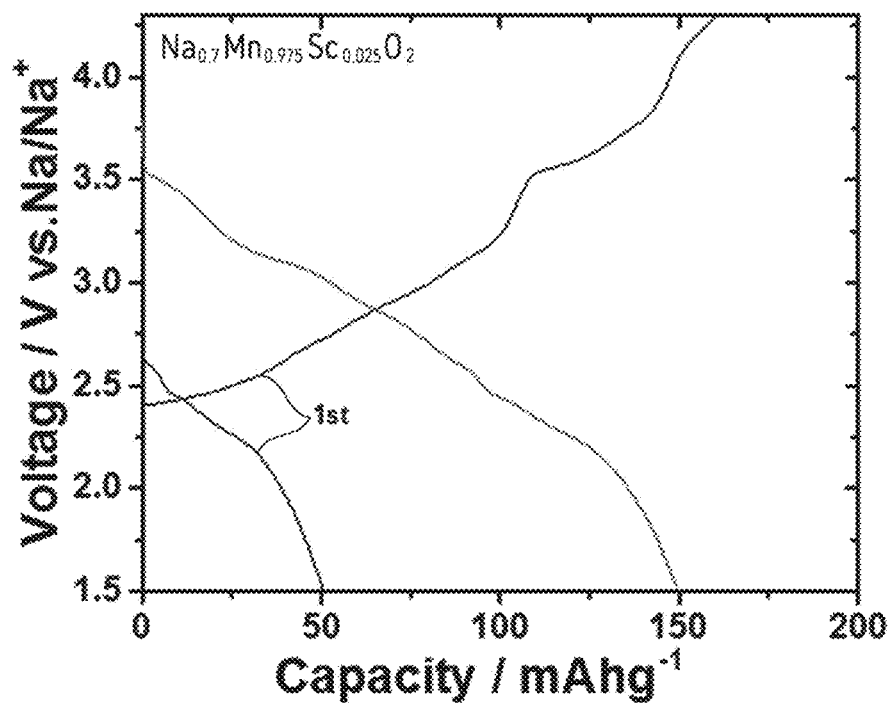

[FIG. 45]
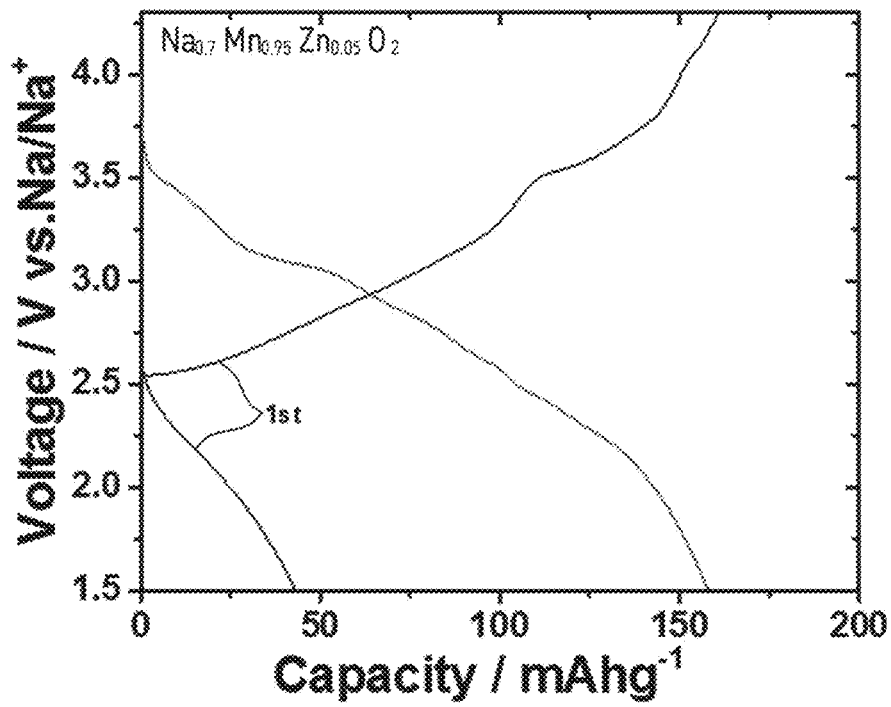
[FIG. 46]
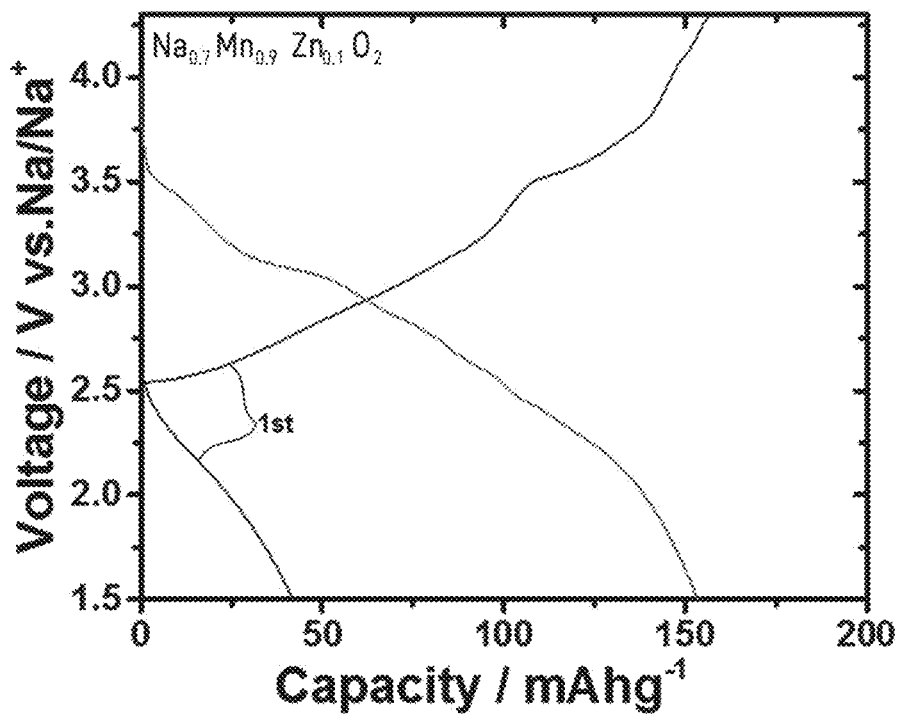

[FIG. 47]
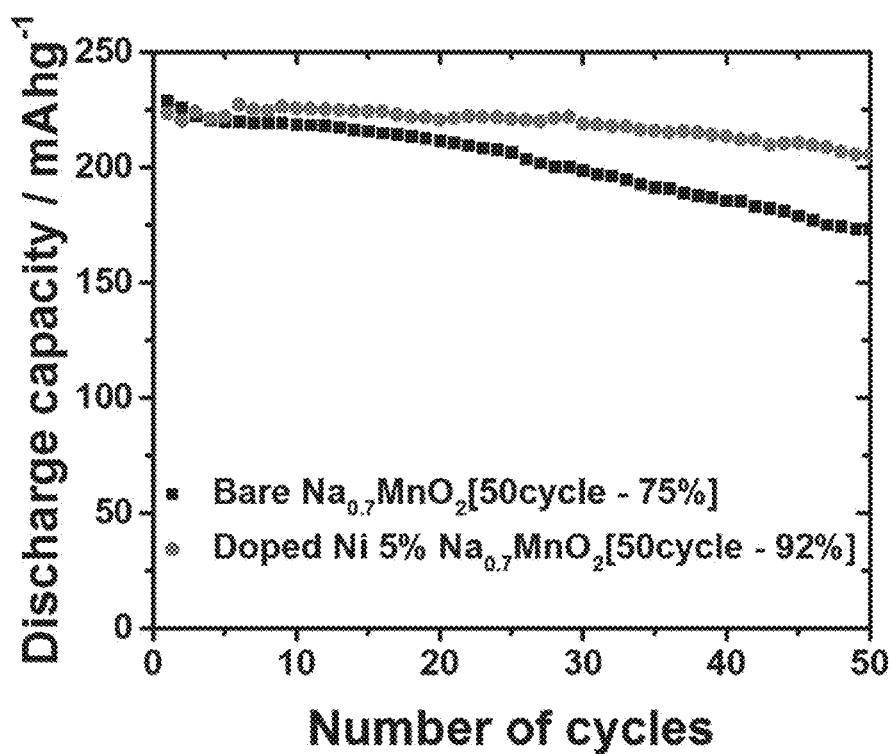

[FIG. 48]
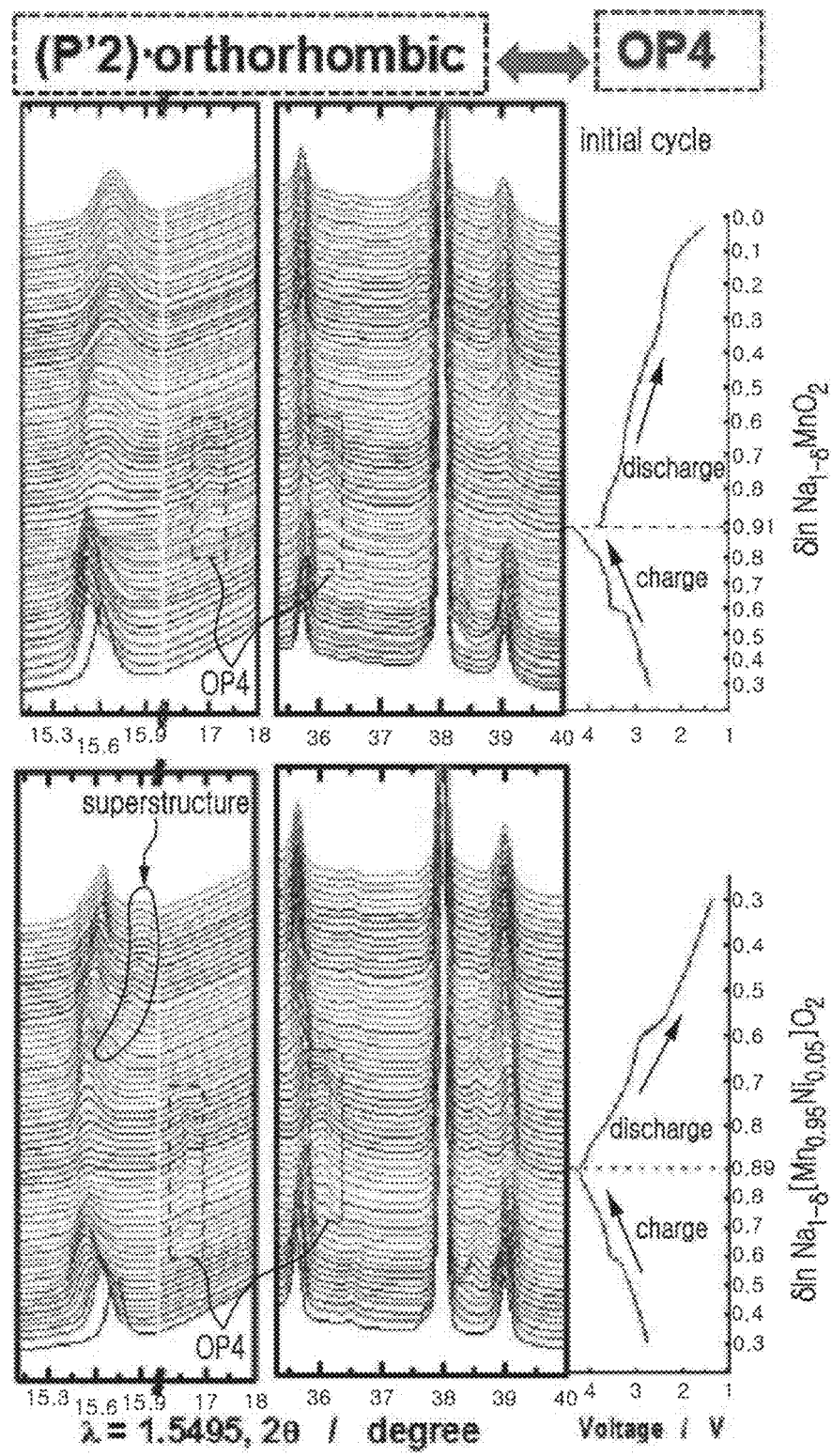

[FIG. 49A]
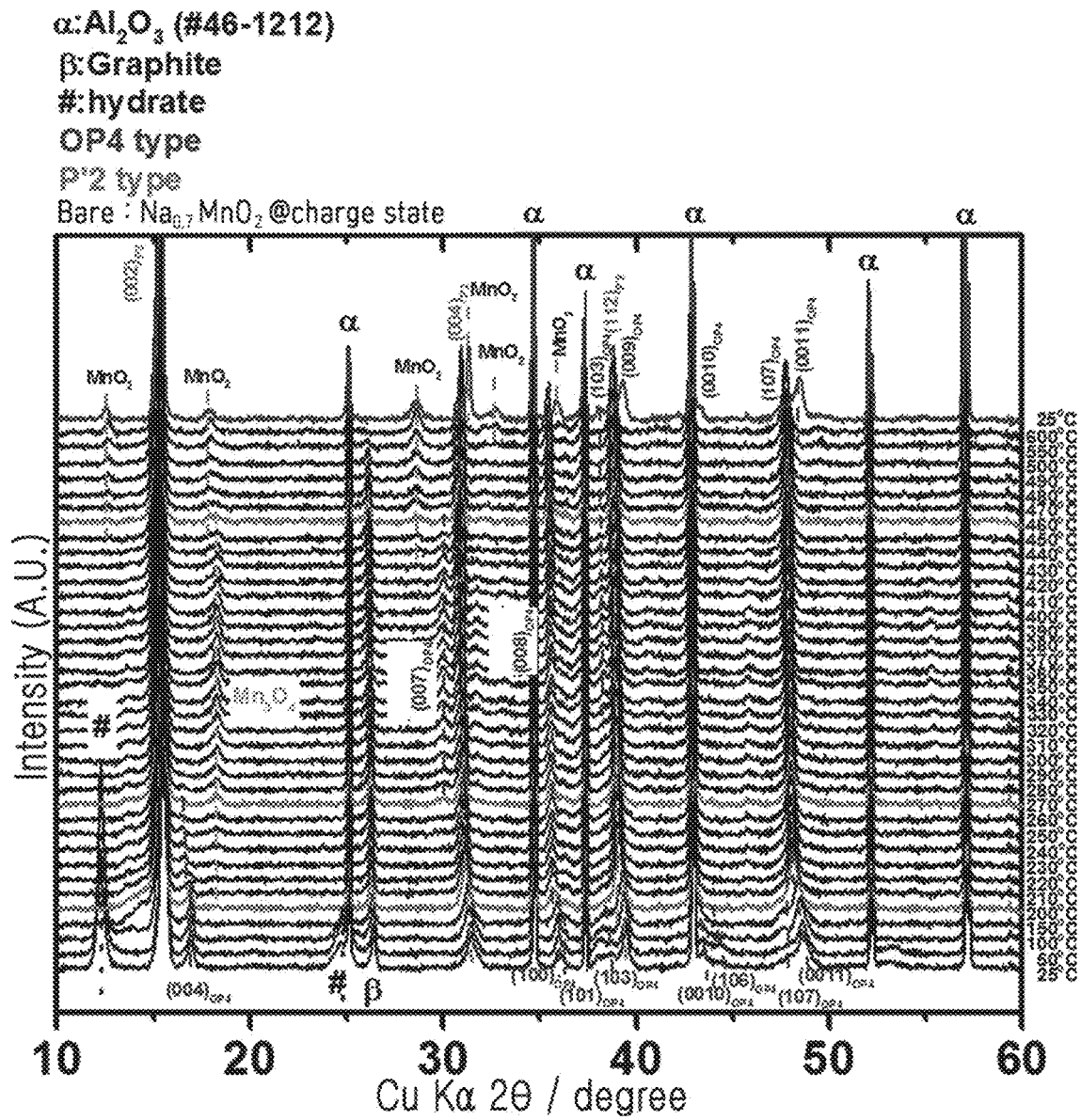

[FIG. 49B]
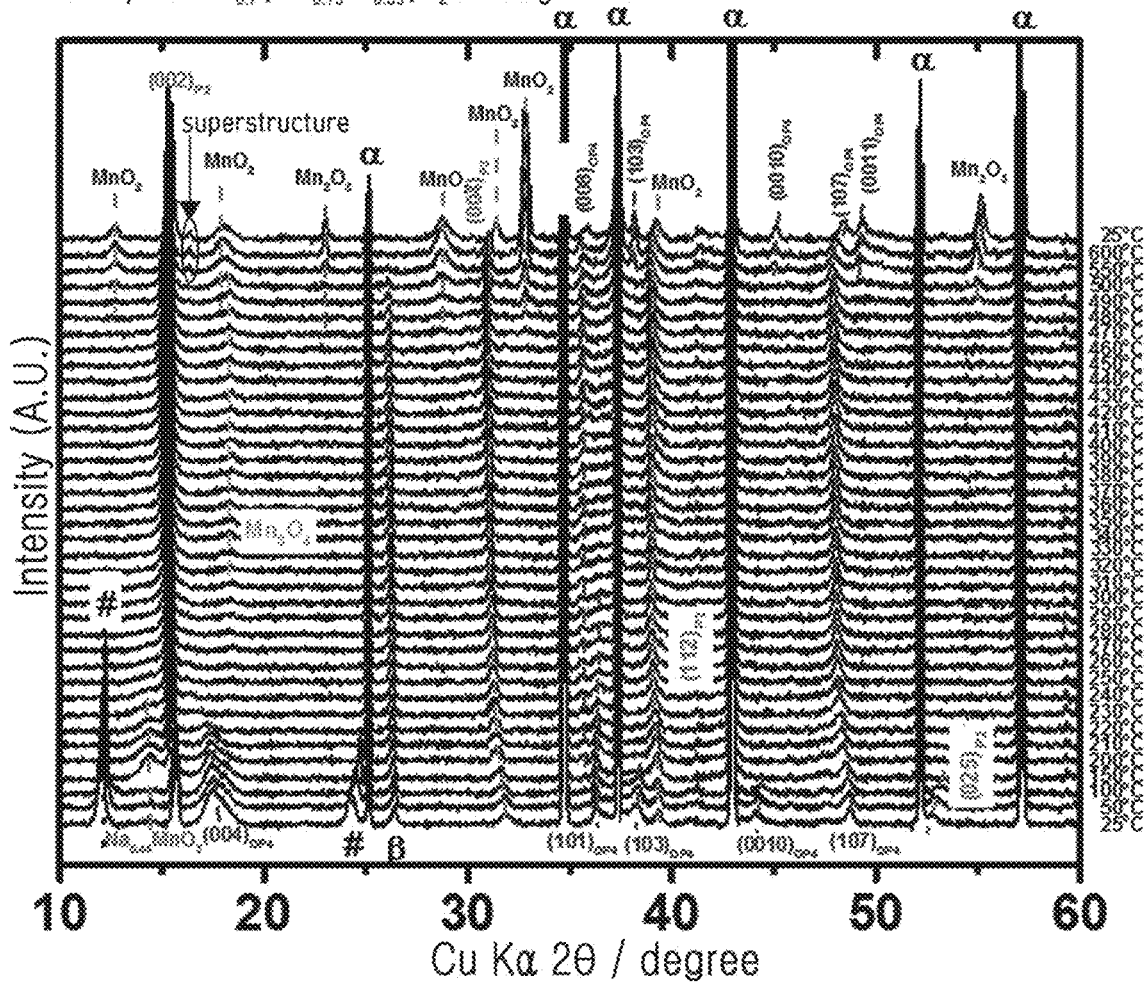

[FIG. 50A]
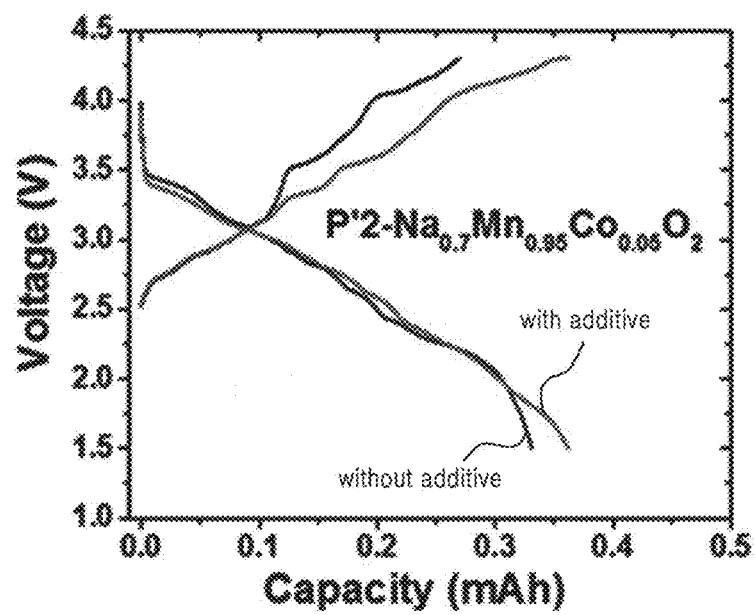
[FIG. 50B]
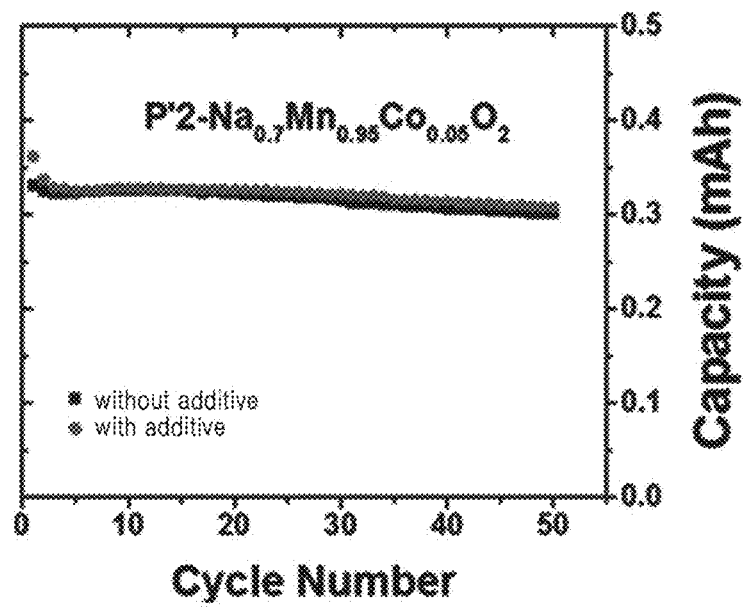

[FIG. 51A]
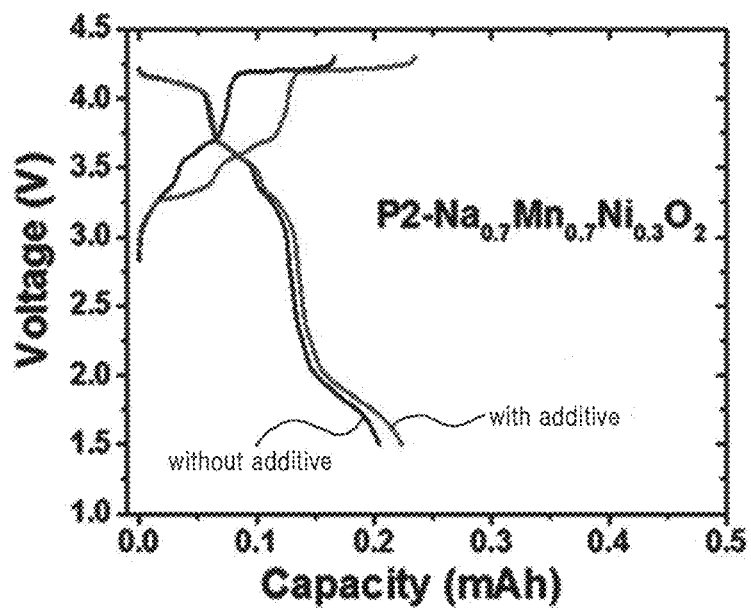
[FIG. 51B]
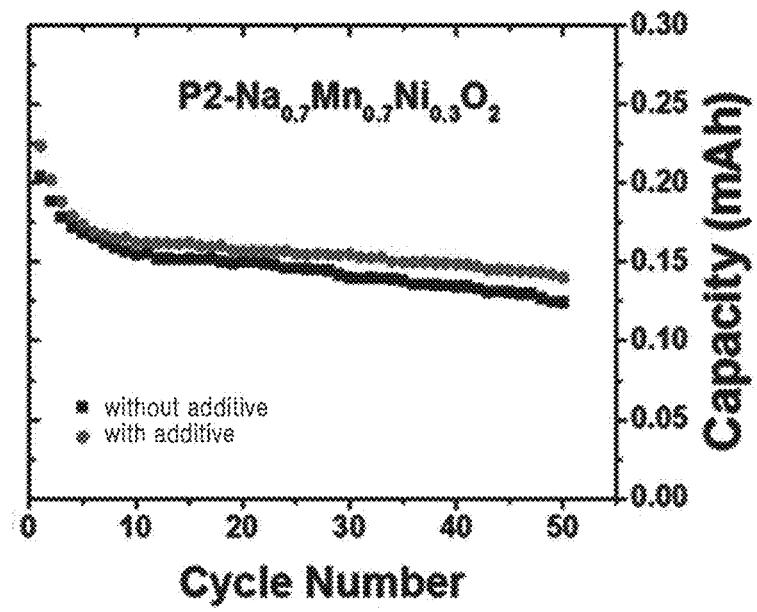

[FIG. 52A]
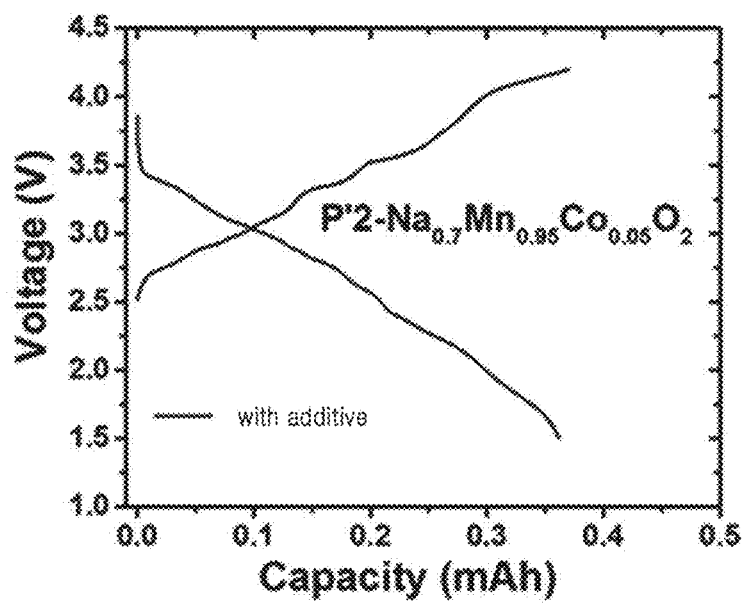
[FIG. 52B]
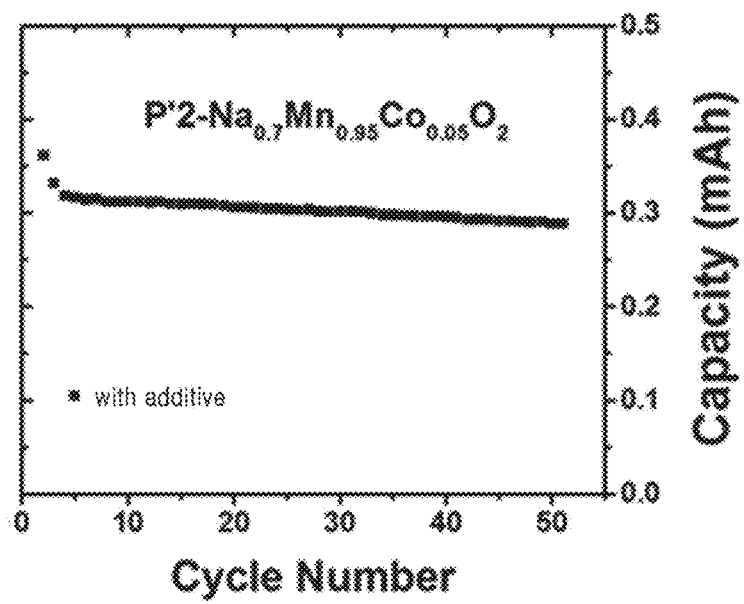

SODIUM-BASED ELECTRODE ACTIVE MATERIAL AND SECONDARY BATTERY COMPRISING SAME

CROSS REFERENCE TO RELATED APPLICATIONS

This application is a National Stage of International Application No. PCT/KR2017/003981 filed Apr. 12, 2017, claiming priorities based on Korean Patent Application Nos. 10-2016-0045097 filed Apr. 12, 2016, 10-2017-0047609 filed Apr. 12, 2017 and 10-2017-0047610 filed Apr. 12, 2017.

TECHNICAL FIELD

The present invention relates to a secondary battery, and particularly, to a secondary battery having a sodium-based electrode active material.

BACKGROUND ART

Secondary batteries are batteries which can be charged as well as discharged and thus repetitively used. A representative lithium secondary battery of the secondary batteries is operated by the principle in which lithium ions included in a cathode active material of a cathode are moved to an anode through an electrolyte and inserted into a layered structure of a anode active material (charging), and the lithium ions inserted into the layered structure of the anode active material return to the cathode (discharging). Such a lithium secondary battery is now commercially available to be used as a small power supply for a mobile phone, a notebook computer, etc., is also expected to be used as a large power supply for a hybrid car, etc., and is estimated that its demand will be increased.

However, a composite metal oxide mainly used as a cathode active material in a lithium secondary battery contains a rare metal element such as lithium, and there is concern that it can not meet the demand increase. Accordingly, studies have been made on a sodium secondary battery using sodium, which is rich in supply and low in cost, as a cathode active material. As an example, Korean Patent Laid-Open Publication No. 2012-0133300 discloses $A_xMnPO_4F$ (A=Li or Na, 0<x≤2) as a cathode active material.

DISCLOSURE

Technical Problem

However, the sodium cathode materials developed so far still do not have excellent structural stability, and it is known that the cells using the sodium cathode materials need to be improved in terms of the discharge capacity retention rate and stability.

Accordingly, an object of the present invention is to provide a secondary battery active material for improving discharge capacity retention characteristics and stability, and a secondary battery including the secondary battery active material.

Technical Solution

To accomplish the object, one aspect of the present invention provides an electrode active material. The electrode active material is represented by the following Chemical Formula 1, and has an orthorhombic crystal system and a space group of Cmcm.

$$Na_x[Mn_{1-y-z}M^1_yM^2_z]O_{2-\alpha}A_\alpha \quad \text{[Chemical Formula 1]}$$

In Chemical Formula 1, x may be 0.5 to 0.8. $M^1$ and $M^2$ may be, regardless of each other, Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi. y may be from 0 to 0.25. z may be from 0 to 0.25. A may be N, O, F, or S, and α may be 0 to 0.1.

The electrode active material represented by the Chemical Formula 1 may be represented by the following Chemical Formula 2.

$$Na_x[Mn_{1-y}M_y]O_{2-\alpha}A_\alpha \quad \text{[Chemical Formula 2]}$$

In Chemical Formula 2, x may be 0.5 to 0.8, M may be Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi, y may be from 0 to 0.25, A may be N, O, F, or S, and α may be 0 to 0.1.

The electrode active material represented by the Chemical Formula 1 may be represented by the following Chemical Formula 3.

$$Na_xMnO_2 \text{ (x may be 0.5 to 0.8)} \quad \text{[Chemical Formula 3]}$$

The electrode active material represented by the Chemical Formula 1 may be represented by the following Chemical Formula 4.

$$Na_x[Mn_{1-y}M_y]O_2 \quad \text{[Chemical Formula 4]}$$

In Chemical Formula 4, x may be 0.5 to 0.8, M may be Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi, y may be from 0.02 to 0.25.

The electrode active material represented by the Chemical Formula 1 may be $Na_{0.7}MnO_2$.

In the above Chemical Formulas, x may be 0.65 to 0.75, y may be 0.025 to 0.1, and M may be Al, Co, Cd, Nd, Rh, Sc, Zn, Fe, or Ni. Specifically, M may be Fe or Ni.

In an XRD graph of the electrode active material having the orthorhombic crystal system and the space group of Cmcm, a first peak representing a (002) plane exhibits an intensity of 5 to 8 times a second peak representing a (004) plane. Further a half width of the first peak representing the (002) plane is 0.2 to 0.3.

To accomplish the object, another aspect of the present invention provides a method of preparing an electrode active material. In the method, a metal salt solution containing a sodium salt and a manganese salt is prepared. The metal salt solution is subjected to ultrasonic spray pyrolysis to obtain a solid powder. The solid powder is heat-treated to obtain the electrode active material represented by the above Chemical Formula 1, having an orthorhombic crystal system, and a space group of Cmcm.

The heat treatment may be performed at 1100° C. to 1300° C. The heat treatment may be performed in an atmosphere containing oxygen of 15 vol. % to 100 vol. % and the remaining inert gas.

To accomplish the object, still another aspect of the present invention provides a secondary battery. The secondary battery comprises a cathode including a cathode active material represented by the above Chemical Formula 1, an anode including an anode active material, and an electrolyte disposed between the cathode and the anode.

The cathode may further include sodium salt. The sodium salt may be $NaNO_2$. The $NaNO_2$ may be in an amount of 3 to 12 parts by weight based on 100 parts by weight of the cathode active material. The cathode may further include a conductive material, and the conductive material may be in an amount of 2 to 9 parts by weight based on 100 parts by weight of the cathode active material. The cathode may further include a binder, and the binder may be in an amount of 2 to 9 parts by weight based on 100 parts by weight of the cathode active material.

Advantageous Effects

According to the present invention, since the sodium based active material represented by the Chemical Formula 1 and having the orthorhombic structure and the space group of Cmcm has the stable crystal structure, the discharge capacity retention characteristic of the secondary battery containing the active material can be improved.

DESCRIPTION OF DRAWINGS

FIG. 1 is a flow chart showing a method of manufacturing a positive electrode active material according to an embodiment of the present invention.

FIG. 2 is a graph showing the results of XRD analysis of $Na_{0.7}MnO_2$ according to Active Material Preparation Examples 1 to 4 and Active Material Comparative Example 1.

FIG. 3 is an enlarged graph showing the result of XRD analysis of $Na_{0.7}MnO$ according to Active Material Preparation Example 1.

FIG. 4 is a graph showing the results of XRD analysis of $Na_{0.7}MnO_2$ according to Active Material Preparation Examples 5 to 8.

FIG. 5 is a schematic diagram for the predicted crystal structure of $Na_{0.7}MnO_2$ according to Active Material Preparation Example 1.

FIG. 6 is a graph showing the XRD analysis results of the solid powders according to Active Material Preparation Example 1 and Active Material Comparative Example 2.

FIGS. 7 to 25 are graphs showing XRD analysis results of $Na_x[Mn_{1-y}M_y]O_2$ according to Active Material Preparation Examples 9 to 27, respectively.

FIG. 26A, FIG. 26B, FIG. 26C, and FIG. 26D are graphs showing the charge-discharge characteristics of the half-cells according to the Battery Preparation Example 1 and the Battery Comparative Examples 1 to 3, respectively.

FIG. 27A and FIG. 27B are graphs showing the charge-discharge characteristics and the discharge capacity according to the number of cycles of the half-cell according to the Battery Preparation Example 1, respectively.

FIGS. 28 to 46 are graphs showing the charge-discharge characteristics of the half-cells according to the Battery Preparation Examples 2 to 20, respectively.

FIG. 47 is a graph showing the discharge capacity according to the number of cycles of the half-cells according to Battery Preparation Examples 1 and 14.

FIG. 48 shows an in-situ synchrotron XRD graph of the positive electrode active materials during the initial cycle of the half-cells according to the Battery Preparation Examples 1 and 14.

FIGS. 49A-49B show in-situ high temperature XRD graph of the positive electrode active materials when the half-cells according to the Battery Preparation Examples 1 and 14 are in a charged state.

FIG. 50A is a graph showing the charging and discharging characteristics of the half-cell according to the Battery Preparation Example 25, and FIG. 50B is a graph showing the discharging capacity according to the number of cycles of the half-cell according to the Battery Preparation Example 25.

FIG. 51A is a graph showing the charging and discharging characteristics of the half-cell according to the Battery Preparation Example 26, and FIG. 51B is a graph showing the discharging capacity according to the number of cycles of the half-cell according to the Battery Preparation Example 26.

FIG. 52A is a graph showing charge and discharge characteristics of the full-cell according to the Full-cell Preparation Example, and FIG. 52B is a graph showing a discharge capacity according to the number of cycles of the full-cell according to the Full-cell Preparation Example.

MODES OF THE INVENTION

Hereinafter, to more fully explain the present invention, exemplary embodiments according to the present invention will be described in further detail with reference to the accompanying drawings. However, the present invention may be embodied in different forms without limitation to the exemplary embodiments explained herein. Like reference numerals denote like elements throughout the specification.

In the specification, the sentence "a first layer is disposed "on" a second layer" means that these layers are in direct contact with each other, and a third layer(s) is/are disposed between these layers.

Positive Electrode Active Material

A positive electrode active material according to one embodiment of the present invention is represented by the following Chemical Formula 1.

$Na_x[Mn_{1-y-z}M^1_yM^2_z]O_{2-\alpha}A_\alpha$     [Chemical Formula 1]

In Chemical Formula 1, x may be 0.5 to 0.8. As an example, x may be 0.6 to 0.8, specifically 0.65 to 0.75. $M^1$ and $M^2$ may be, regardless of each other, transition metals or post-transition metals, for example, Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi. $M^1$ and $M^2$ may be the same or different from each other. y may be from 0 to 0.25. z may be from 0 to 0.25. A may be N, O, F, or S, and a can be 0 to 0.1.

In one example, the positive electrode active material may be represented by the following Chemical Formula 2.

$Na_x[Mn_{1-y}M_y]O_{2-\alpha}A_\alpha$     [Chemical Formula 2]

In Chemical Formula 2, x may be 0.5 to 0.8. As an example, x may be 0.6 to 0.8, specifically 0.65 to 0.75. M may be Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi. y may be from 0 to 0.25. As an example, y may be from 0 to 0.2, specifically from 0 to 0.1. Also, y may be 0.02 to 0.25, or 0.025 to 0.1. A can be N, O, F, or S, and a can be 0 to 0.1.

The positive electrode active material represented by Chemical Formula 1 or 2 may have an orthorhombic crystal system. Specifically, the positive electrode active material is a layered compound having an orthorhombic structure in which a sodium layer and a transition metal oxide layer are alternately stacked, and a space group thereof is Cmcm. In the XRD graph of the positive electrode active material, the first peak representing the (002) plane may exhibit the intensity of 5 to 8 times the second peak representing the (004) plane. Further, the half width of the first peak representing the (002) plane in the XRD graph of this active material may be about 0.2 to about 0.3, specifically about 0.21 to about 0.24.

Further, the positive electrode active material may be represented by the following chemical formula 3 or 4.

  [Chemical Formula 3]

Na$_x$MnO$_2$ (x may be 0.5 to 0.8)

In Chemical Formula 3, x may be from 0.5 to 0.8. As an example, x may be 0.6 to 0.8, specifically 0.65 to 0.75.

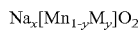  [Chemical Formula 4]

Na$_x$[Mn$_{1-y}$M$_y$]O$_2$

In Chemical Formula 4, x may be 0.5 to 0.8. As an example, x may be 0.6 to 0.8, specifically 0.65 to 0.75. M may be Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi. y may be from 0.02 to 0.25. As an example, y may be 0.02 to 0.2, specifically y may be 0.025 to 0.1.

FIG. 1 is a flow chart showing a method of manufacturing a positive electrode active material according to an embodiment of the present invention.

Referring to FIG. 1, a metal salt solution containing a sodium salt and a manganese salt can be prepared (S10). The metal salt solution may further contain a metal salt(s) other than the sodium salt and manganese salt. The molar ratio of sodium, manganese, first metal other than sodium and manganese (M$^1$ in the formula 1) and second metal other than sodium and manganese (M$^2$ in the formula 1) in the metal salt solution is x: 1-y-z:y:z (x, y, and z is as defined in Chemical Formula 1). The metal salt may be a metal carbonate, a metal nitrate, or a metal oxalate. The sodium salt may be NaNO$_3$, Na$_2$CO$_3$, or NaHCO$_3$, and the manganese salt may be Mn(NO$_3$)$_2$. These metal salts, specifically, sodium salts, manganese salts, and salt(s) of metal(s) other than sodium and manganese can have the form of hydrates. The metal salt solution may contain distilled water as a solvent.

A chelating agent may further be added in the metal salt solution. The chelating agent may be selected from the group consisting of tartaric acid, urea, citric acid, formic acid, glycolic acid, polyacrylic acid, adipic acid, and glycine. The chelating agent may be contained in an amount of about 10 wt. % to 30 wt. % based on the weight of the metal salt. Meanwhile, the metal salt solution may further include a crystal growth inhibitor. The crystal growth inhibitor may be saccharide or derivatives thereof, for example, glucose, sucrose, or derivatives thereof. The crystal growth inhibitor may be contained in an amount of 1 wt. % to 10 wt. % based on the weight of the metal salt.

The metal salt solution can be sufficiently mixed by stirring.

Thereafter, the metal salt solution is subjected to ultrasonic spray pyrolysis to obtain a solid powder (S20). The ultrasonic spray pyrolysis is a method in which the metal salt solution is sprayed using ultrasonic waves to form droplets and the droplets are pyrolyzed. During the pyrolysis process, the metal salt droplets may be converted into metal oxide powder. The ultrasonic spray pyrolysis has an advantage of obtaining a metal oxide having a pure composition at a low temperature and a short time as compared with the solid phase method.

Thereafter, the solid powder is heat-treated in a dry air atmosphere to obtain a positive electrode active material (S30). The dry air atmosphere may be a dry atmosphere containing a dry oxygen atmosphere having about 15 vol. % to about 100 vol. %, specifically, about 20 vol. % to about 100 vol. % of oxygen and the remaining inert gas. Here, the inert gas may be nitrogen. In this specification, "dry atmosphere" may mean an atmosphere not containing moisture. The heat treatment in this atmosphere has the advantage of preventing the volatilization of sodium. Also, the heat treatment can be performed at about 1100° C. to about 1300° C.

The positive electrode active material having the orthorhombic structure as in the above Chemical Formulas and having a space group of Cmcm can improve the capacity and life characteristics of the sodium secondary battery.

Further, the secondary battery having a high capacity characteristic can be used as a unit battery of a battery module, which is the power source of a medium and large-sized device. The medium and large-sized devices may include, for example, a power tool powered by an electric motor; an electric vehicle (EV) including a hybrid electric vehicle (HEV) and a plug-in hybrid electric vehicle (PHEV); an electric motorcycle including an E-bike and an E-scooter; or an electric golf cart, but the present invention is not limited thereto.

A sodium secondary battery among the applicable secondary batteries will be described below.

Sodium Secondary Battery

A sodium secondary battery according to an embodiment of the present invention includes a positive electrode containing the positive electrode active material described above, a negative electrode containing a negative electrode active material in which sodium can be intercalated or de-intercalated, and electrolyte disposed therebetween.

Positive Electrode

The positive electrode active material described in Chemical Formula 1, a conductive material, and a binder may be mixed to obtain a positive electrode material.

The positive electrode active material or cathode active material of Chemical Formula 1 may have a stable crystal structure and thus has a low degree of deterioration due to moisture and can lower an operating voltage. However, since the mole ratio of sodium to the transition metal (Mn, M$^1$, and M$^2$ in Formula 1) is less than 1, that is, x in Chemical Formula 1 is smaller than 1, the content of sodium in the positive electrode material may not be enough. To compensate for this, a sodium salt may be added to the positive electrode material. Na ions contained in the sodium salt may be reduced during the initial charging process of the battery to serve as an additional source of Na. In this case, the initial charging capacity of the sodium secondary battery can be improved to improve battery performance. The sodium salt may be NaNO$_2$, and the sodium salt may be added in an amount of about 1 to about 20 parts by weight, specifically about 3 to about 20 parts by weight or about 3 to about 15 parts by weight, more preferably about 3 to about 12 parts by weight, as an example, about 5 to about 7 parts by weight, based on 100 parts by weight of the positive electrode active material.

The conductive material may be a carbon material such as natural graphite, artificial graphite, cokes, carbon black, carbon nanotubes, or graphene. The binder may include a thermoplastic resin, for example, a fluorine resin such as polyvinylidene fluoride, polytetrafluoroethylene, tetrafluoroethylene, a vinylidene fluoride-based copolymer or hexafluoropropylene, and/or a polyolefin resin such as polyethylene or polypropylene.

When the sodium salt is added, the conductive material may be contained in an amount of about 2 to about 9 parts by weight, specifically about 4 to about 7 parts by weight, more specifically about 5 to about 6 parts by weight, based on 100 parts by weight of the positive electrode active material, and the binder may be contained in an amount of about 2 to about 9 parts by weight, specifically about 4 to about 7 parts by weight, and particularly about 5 to about 6 parts by weight based on 100 parts by weight of the positive electrode active material.

The positive electrode material may be formed on a positive electrode collector to form a positive electrode. The positive electrode collector may be a conductive material such as Al, Ni, or stainless steel. To apply the positive electrode material onto the positive electrode collector, pressure molding; or a method of preparing a paste using an organic solvent, applying the paste onto the collector, and fixing the paste by pressing may be used. The organic solvent may be a polar aprotic solvent: an amine-based solvent such as N,N-dimethylaminopropylamine, or diethyltriamine; an ether-based solvent such as ethyleneoxide or tetrahydrofuran; a ketone-based solvent such as methylethylketone; an ester-based solvent such as methylacetate; dimethylacetamide or N-methyl-2-pyrrolidone. The application of the paste on the positive electrode collector may be performed by, for example, gravure coating, slit dye coating, knife coating, or spray coating.

Negative Electrode

A negative electrode active material or an anode active material may be prepared using a metal, a metal alloy, a metal oxide, a metal fluoride, a metal sulfide, or a carbon material such as natural graphite, artificial graphite, cokes, carbon black, carbon nanotubes, or graphene, in which a intercalation and deintercalation of Na ions or a conversion reaction may occur.

A negative electrode material may be obtained by mixing the negative electrode active material, a conductive material, and a binder. Here, the conductive material may be a carbon material such as natural graphite, artificial graphite, cokes, carbon black, carbon nanotubes, or graphene. The binder may include a thermoplastic resin, for example, a fluoride resin such as polyvinylidene fluoride, polytetrafluoroethylene, tetrafluoroethylene, a vinylidene fluoride-based copolymer, or hexafluoropropylene, and/or a polyolefin resin such as polyethylene or polypropylene.

A negative electrode may be formed by applying the negative electrode material onto the negative electrode collector. The negative electrode collector may be a conductive material such as Al, Ni, or stainless steel. To apply the negative electrode material onto the negative electrode collector, pressure molding; or a method of preparing a paste using an organic solvent, applying the paste onto the collector, and fixing the paste by pressing may be used. The organic solvent may be a polar aprotic solvent: an amine-based solvent such as N,N-dimethylaminopropylamine, or diethyltriamine; an ether-based solvent such as ethyleneoxide or tetrahydrofuran; a ketone-based solvent such as methylethylketone; an ester-based solvent such as methylacetate; dimethylacetamide or N-methyl-2-pyrrolidone. The application of the paste on the negative electrode collector may be performed by, for example, gravure coating, slit dye coating, knife coating, or spray coating.

Electrolyte

An electrolyte may contain $NaClO_4$, $NaPF_6$, $NaAsF_6$, $NaSbF_6$, $NaBF_4$, $NaCF_3SO_3$, $NaN(SO_2CF_3)_2$, a lower aliphatic carboxylic acid sodium salt, $NaAlCl_4$ or a mixture of two or more thereof. Among them, it is preferable to use a material containing fluorine. Further, the electrolyte may be dissolved in an organic solvent and used as a non-aqueous electrolyte. Examples of the organic solvent include carbonates such as propylene carbonate, ethylene carbonate, dimethyl carbonate, diethyl carbonate, ethyl methyl carbonate, isopropyl methyl carbonate, vinylene carbonate, 4-trifluoromethyl-1,3-dioxolan-2-one, 1,2-di (methoxycarbonyloxy) ethane; ethers such as 1,2-dimethoxyethane, 1,3-dimethoxypropane, pentafluoropropylmethylether, 2,2,3,3-tetrafluoropropyldifluoromethylether, tetrahydrofuran, 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethylsulfoxide, and 1,3-propanesultone; or an organic solvent in which a fluorine-substituted group is further introduced to one of the organic solvent may be used.

Alternatively, a solid electrolyte may be used. The solid electrolyte may be an organic solid electrolyte such as a polyethylene oxide-based polymer compound, a polymer compound containing at least one of a polyorganosiloxane chain and a polyoxyalkylene chain. A so-called gel type electrolyte in which a non-aqueous electrolyte is supported on the polymer compound may also be used. On the other hand, inorganic solid electrolytes such as $Na_2S$—$SiS_2$, $Na_2S$—$GeS_2$, $NaTi_2(PO_4)_3$, $NaFe_2(PO_4)_3$, $Na_2(SO_4)_3$, $Fe_2(SO_4)_2(PO_4)$, $Fe_2(MoO_4)_3$ may be used. In some cases, the safety of the sodium secondary battery can be enhanced by using these solid electrolytes. Further, the solid electrolyte may serve as a separator to be described later, and in such a case, a separator may not be required.

Separator

A separator may be disposed between the positive electrode and the negative electrode. Such a separator may be a material having a form of a porous film, a non-woven fabric, or a woven fabric composed of a material such as a polyolefin resin such as polyethylene or polypropylene, a fluorine resin, or a nitrogen-containing aromatic polymer. As long as a mechanical strength is maintained, the thickness of the separator is preferably small because of a high volume energy density of a battery and a small internal resistance. The thickness of the separator may be, generally, about 5 to 200 μm, and particularly, 5 to 40 μm.

Method of Manufacturing Sodium Secondary Battery

A secondary battery may be manufactured by forming an electrode group by sequentially stacking the positive electrode, the separator, and the negative electrode, accommodating the electrode group, which is rolled, if needed, into a battery can, and immersing the electrode group in the electrolyte. On the other hand, a secondary battery may be manufactured by forming an electrode group by stacking the positive electrode, the solid electrolyte, and the negative electrode, and rolling the electrode group, if needed, and accommodating the electrode group in a battery can.

Hereinafter, exemplary examples are provided to help in understanding the present invention. However, the following examples are merely provided to help in understanding of the present invention, and the present invention is not limited to the following examples.

EXAMPLES

Examples for Preparing Active Materials

Active Material Preparation Example 1: $Na_{0.7}MnO_2$ 0.056 mol of sodium nitrate, 0.08 mol of manganese (II) nitrate tetrahydrate, citric acid, and sucrose were dissolved in distilled water and the mixture was stirred using a magnetic bar for 12 hours or more to be mixed thoroughly. The citric acid was used at a ratio of 0.2 times the weight of the nitrates and the sucrose was used at a ratio of 0.05 times the weight of the nitrates. The stirred solution was injected through a nozzle of an ultrasonic spray into a quartz tube maintained at 400° C. at a constant rate to obtain a solid powder. The solid powder was pelletized at a constant pressure and then placed in an alumina crucible. The alumina crucible was heated at a rate of 5° C./min in a dry air atmosphere containing 21 vol. % of $O_2$ and 79 vol. % of $N_2$, was maintained at 1200° C. for 10 hours, and then slowly cooled to 30° C. at a rate of 3° C./min to prepare $Na_{0.7}MnO_2$.

Active Material Preparation Examples 2 and 3: $Na_{0.7}MnO_2$

The same method as in Active Material Preparation Example 1 was carried out except that the pelletized solid powder was heat-treated at 1150° C. for 10 hours (Active Material Preparation Example 2) or heat-treated at 1100° C. for 10 hours (Active Material Preparation Example 3) to obtain $Na_{0.7}MnO_2$.

Active Material Preparation Example 4: $Na_{0.7}MnO_2$

The same method as in Active Material Preparation Example 1 was carried out except that the pelletized solid powder was heat-treated at 1300° C. for 10 hours to obtain $Na_{0.7}MnO_2$.

Active Material Preparation Examples 5 to 8: $Na_{0.7}MnO_2$ $Na_{0.7}MnO_2$ was prepared in the same manner as in Active Material Preparation Example 1 except that the pelletized solid powder was heat-treated in the dry atmosphere shown in Table 1 below.

Active Material Preparation Examples 9 to 27: $Na_x[Mn_{1-y}M_y]O_2$ $Na_x[Mn_{1-y}M_y]O_2$ was prepared in the same manner as in Active Material Preparation Example 1 except that sodium nitrate, manganese (II) nitrate tetrahydrate and the salts of other metal (M) were dissolved in distilled water along with citric acid and sucrose in an equivalent amount as shown in the following Table 1. As the salt of the metal (M), silver nitrate in Active Material Preparation Example 9, aluminum nitrate nonahydrate in Active Material Preparation Examples 10 and 11, bismuth (III) nitrate pentahydrate in Active Material Preparation Example 12, cobalt (II) nitrate hexahydrate in Active Material Preparation Examples 13 and 14, cadmium nitrate tetrahydrate in Active Material Preparation Example 15, and copper (II) nitrate trihydrate in Active Material Preparation Examples 16 and 17, iron (III) nitrate nonahydrate in Active Material Preparation Example 18, indium (III) nitrate hydrate in Active Material Preparation Example 19, neodymium (II) nitrate hydrate in Active Material Preparation Example 20, nickel (II) nitrate hexahydrate in the Active Material Preparation Examples 21 and 22, lead (III) nitrate in the Active Material Preparation Example 23, and rhodium (III) nitrate hydrate in the Active Material Preparation Example 24, scandium (III) nitrate hydrate in the Active Material Preparation Example 25, and zinc nitrate hydrate in the Active Material Preparation Examples 26 and 27 were used.

Active Material Comparative Example 1: $Na_{0.7}MnO_2$

The same method as in Active Material Preparation Example 1 was carried out except that the pelletized solid powder was heat-treated at 1000° C. for 10 hours to obtain $Na_{0.7}MnO_2$.

Active Material Comparative Example 2

The heat-treated solid powder was obtained in the same manner as in Active Material Preparation Example 1, except that the pelletized solid powder was heat-treated in a normal atmospheric atmosphere instead of dry air.

Active Material Comparative Example 3: $Na_{0.7}(Mn_{0.75}Fe_{0.25})O_2$

The same method as in Active Material Preparation Example 1 was carried out except that a solution containing 0.056 mol of sodium nitrate, 0.06 mol of manganese (II) nitrate tetrahydrate, and 0.02 mol of iron (III) nitrate nonahydrate, citric acid, and sucrose was used, the stirred solution was injected into a quartz tube maintained at 600° C. at a constant rate through a nozzle of an ultrasonic sprayer to obtain solid powder, and the pelletized solid powder was heated to 900° C. for 10 hours to obtain $Na_{0.7}(Mn_{0.75}Fe_{0.25})O_2$.

Active Material Comparative Example 4: $Na_{0.7}(Mn_{0.5}Fe_{0.5})O_2$

The same method as in Active Material Preparation Example 1 was carried out except that a solution containing 0.056 mol of sodium nitrate, 0.04 mol of manganese (II) nitrate tetrahydrate, and 0.04 mol of iron (III) nitrate nonahydrate, citric acid, and sucrose was used, the stirred solution was injected into a quartz tube maintained at 600° C. at a constant rate through a nozzle of an ultrasonic sprayer to obtain solid powder, and the pelletized solid powder was heated to 1000° C. for 10 hours to obtain $Na_{0.7}(Mn_{0.5}Fe_{0.5})O_2$.

TABLE 1

| Active Material Preparation Examples | Composition | Heat-treatment atmosphere | | Heat-treatment Temp. [° C.] |
|---|---|---|---|---|
| | | $O_2$ [vol. %] | $N_2$ [vol. %] | |
| Preparation Example 1 | $Na_{0.7}MnO_2$ | 21 | 79 | 1200 |
| Preparation Example 2 | | | | 1150 |
| Preparation Example 3 | | | | 1100 |
| Preparation Example 4 | | | | 1300 |
| Preparation Example 5 | | 100 | — | 1200 |
| Preparation Example 6 | | 30 | 70 | |
| Preparation Example 7 | | 50 | 50 | |
| Preparation Example 8 | | 70 | 30 | |
| Preparation Example 9 | $Na_{0.7}(Mn_{0.975}Ag_{0.025})O_2$ | 21 | 79 | 1200 |
| Preparation Example 10 | $Na_{0.7}(Mn_{0.95}Al_{0.05})O_2$ | | | |
| Preparation Example 11 | $Na_{0.7}(Mn_{0.9}Al_{0.1})O_2$ | | | |
| Preparation Example 12 | $Na_{0.7}(Mn_{0.975}Bi_{0.025})O_2$ | | | |
| Preparation Example 13 | $Na_{0.7}(Mn_{0.95}Co_{0.05})O_2$ | | | |
| Preparation Example 14 | $Na_{0.7}(Mn_{0.9}Co_{0.1})O_2$ | | | |
| Preparation Example 15 | $Na_{0.7}(Mn_{0.975}Cd_{0.025})O_2$ | | | |
| Preparation Example 16 | $Na_{0.7}(Mn_{0.95}Cu_{0.05})O_2$ | | | |
| Preparation Example 17 | $Na_{0.7}(Mn_{0.9}Cu_{0.1})O_2$ | | | |
| Preparation Example 18 | $Na_{0.7}(Mn_{0.95}Fe_{0.05})O_2$ | | | |
| Preparation Example 19 | $Na_{0.7}(Mn_{0.975}In_{0.025})O_2$ | | | |
| Preparation Example 20 | $Na_{0.7}(Mn_{0.975}Nd_{0.025})O_2$ | | | |
| Preparation Example 21 | $Na_{0.7}(Mn_{0.95}Ni_{0.05})O_2$ | | | |
| Preparation Example 22 | $Na_{0.7}(Mn_{0.9}Ni_{0.1})O_2$ | | | |
| Preparation Example 23 | $Na_{0.7}(Mn_{0.95}Pb_{0.05})O_2$ | | | |
| Preparation Example 24 | $Na_{0.7}(Mn_{0.975}Rh_{0.025})O_2$ | | | |
| Preparation Example 25 | $Na_{0.7}(Mn_{0.975}Sc_{0.025})O_2$ | | | |
| Preparation Example 26 | $Na_{0.7}(Mn_{0.95}Zn_{0.05})O_2$ | | | |
| Preparation Example 27 | $Na_{0.7}(Mn_{0.9}Zn_{0.1})O_2$ | | | |
| Comparative Example 1 | $Na_{0.7}MnO_2$ | 21 | 79 | 1000 |
| Comparative Example 2 | $Mn_3O_4$ | normal atmospheric atmosphere | | 1200 |
| Comparative Example 3 | $Na_{0.7}(Mn_{0.75}Fe_{0.25})O_2$ | 21 | 79 | 900 |
| Comparative Example 4 | $Na_{0.7}(Mn_{0.5}Fe_{0.5})O_2$ | 21 | 79 | 1000 |

FIG. 2 is a graph showing the results of XRD analysis of $Na_{0.7}MnO_2$ according to Active Material Preparation Examples 1 to 4 and Active Material Comparative Example 1, FIG. 3 is an enlarged graph showing the result of XRD analysis of $Na_{0.7}MnO_2$ according to Active Material Preparation Example 1, and FIG. 4 is a graph showing the results of XRD analysis of $Na_{0.7}MnO_2$ according to Active Material Preparation Examples 5 to 8.

Referring to FIG. 2, while $Na_{0.7}MnO_2$ in Comparative Example 1 which is heat-treated at 1000° C. shows an XRD peak of a hexagonal-oriented P2 structure having a space group of $P6_3/mmc$ and Cmcm, it can be seen that the $Na_{0.7}MnO_2$ according to Preparation Examples 1 to 4 exhibits an XRD peak of an orthorhombic structure having a space group of Cmcm.

Referring to FIG. 3, the $Na_{0.7}MnO_2$ in the Active Material Preparation Example 1 which is heat-treated at 1200° C. shows an XRD peak of the orthorhombic structure having a space group of Cmcm like $Na_{0.7}MnO_2$ according to the Active Material Preparation Examples 2 to 4. Specifically, $Na_{0.7}MnO_2$ having a orthorhombic structure having a space group of Cmcm showed a first peak showing a (002) plane at about 15 degrees and a second peak showing a (004) plane at about 32 degrees. However, it can be seen that the $Na_{0.7}MnO_2$ according to Active Material Preparation Example 1 heat-treated at 1200° C. has a somewhat clearer XRD peaks of the orthorhombic structure having a space group of Cmcm as compared with $Na_{0.7}MnO_2$ according to the Active Material Preparation Examples 2 to 4.

Referring to FIG. 4, it can be seen that $Na_{0.7}MnO_2$ according to Active Material Preparation Examples 5 to 8 heat-treated in a dry air atmosphere containing 30, 50, 70, and 100 vol. % of $O_2$ and remaining $N_2$ shows the XRD peak of the orthorhombic structure having the space group of Cmcm as in the case of $Na_{0.7}MnO_2$ according to Active Material Preparation Examples 1 to 4, which are heat-treated in a dry air atmosphere containing 21 vol. % of $O_2$ and 79 vol. % of $N_2$.

Referring again to FIGS. 2, 3, and 4, the active material of the orthorhombic structure having the space group of Cmcm shows that the half width of the first peak representing the (002) plane at about 15 degrees is about 0.2 to about 0.3, specifically about 0.21 to about 0.24. In addition, the intensity of the first peak is found to be about 5 times to about 8.5 times, specifically about 5.47 times to about 8.076 times the intensity of the second peak representing the (004) plane. However, active material of the hexagonal-oriented P2 structure having a space group of $P6_3/mmc$ and Cmcm according to Comparative Example 1 shows that the intensity of the first peak is about twice the intensity of the second peak.

As described above, $Na_{0.7}MnO_2$ according to Active Material Preparation Examples shows that the half width of the first peak representing the (002) plane is 0.3 or less, and the intensity of the first peak representing the (002) plane is very high. This may mean that $Na_{0.7}MnO_2$ according to Active Material Preparation Examples is very good in crystallinity. In addition, the ratio of the intensity of the first peak representing the (002) plane to the intensity of the second peak representing the (004) plane is 5 or more. This may mean that the (002) plane is continuously formed in the layered structure.

In addition, it can be seen that the active material of the orthorhombic structure having a space group of Cmcm according to the present Examples shows almost no impurity peak appearing at about 25 degrees. In other words, the intensity of the first peak indicating the (002) plane with respect to the intensity of the impurity peak appearing at around 25 degrees may be about 100 times or more. This may mean that the active material having a orthorhombic structure having a space group of Cmcm according to the present Active Material Preparation examples has a very excellent crystal structure.

FIG. 5 is a schematic diagram for the crystal structure of $Na_{0.7}MnO_2$ according to Active Material Preparation example 1, which is predicted from the XRD peaks.

Referring to FIG. 5, it can be seen that the crystal structure of $Na_{0.7}MnO_2$ according to Active Material Preparation Example 1 is a layered compound in which a sodium layer and a manganese oxide layer are alternately stacked.

FIG. 6 is a graph showing the XRD analysis results of the solid powders according to Active Material Preparation Example 1 and Active Material Comparative Example 2.

Referring to FIG. 6, while the solid powder according to Preparation Example 1 heat-treated at 1200° C. in a dry air atmosphere exhibits a orthorhombic structure of $Na_{0.7}MnO_2$ having a space group of Cmcm, the solid powder according to Comparative Example 2 heat-treated at 1200° C. in a normal atmospheric atmosphere shows $Mn_3O_4$. These result shows that sodium vaporization can be prevented by heat treatment in a dry air atmosphere instead of a normal atmospheric atmosphere.

FIGS. 7 to 25 are graphs showing XRD analysis results of $Na_x[Mn_{1-y}M_y]O_2$ according to Active Material Preparation Examples 9 to 27, respectively.

Referring to FIGS. 7 to 25, a first peak representing (002) plane at about 15 degrees and a second peak representing (004) plane at about 32 degrees are shown. In addition, as shown in FIG. 2, the characteristic peaks of the orthorhombic structure having a space group of Cmcm are shown in FIGS. 7 to 25. Therefore, it can be seen that $Na_x[Mn_{1-y}M_y]O_2$ according to Active Material Preparation Examples 9 to 27 has a orthorhombic structure having a space group of Cmcm.

Also, $Na_x[Mn_{1-y}M_y]O_2$ according to Active Material Preparation Examples 9 to 27 show that the half width of the first peak representing (002) plane may be about 0.2 to about 0.3, specifically about 0.21 to about 0.24, which is the same as those described in the description of FIGS. 2 and 4. Further, the intensity of the first peak may be about 5 times to about 8.5 times, specifically about 5.47 times to about 8.076 times the intensity of the second peak. In addition, it can be seen that $Na_x[Mn_{1-y}M_y]O_2$ according to Active Material Preparation Examples 9 to 27 hardly show an impurity peak appearing at about 25 degrees. In other words, the intensity of the first peak indicating (002) plane with respect to the intensity of the impurity peak appearing at around 25 degrees may be about 100 times or more.

Battery Preparation Example 1: Preparation of Half-Cell Having Positive Electrode Using Orthorhombic $Na_{0.7}MnO_2$ The orthorhombic $Na_{0.7}MnO_2$ powder prepared in Active Material Preparation Example 1, conductive material (Super-P, KS-6), and binder (polyvinylidene fluoride) were mixed in an organic solvent (N-Methyl-2-Pyrrolidone, NMP) at a weight ratio of 85:7.5:7.5. Thereafter, it was coated on an aluminum current collector and pressed to form the positive electrode.

Thereafter, metal sodium was used as a negative electrode, a glass filter was used as a separator, and a nonaqueous electrolyte solution containing $NaPF_6$ as an electrolyte and organic solvent including propylene carbonate (PC, 98 vol. %) and fluoroethylene carbonate (FEC, 2 vol. %) to prepare a half-cell.

Battery Preparation Examples 2 to 20: Preparation of Half-Cell Having Positive Electrode Using Orthorhombic $Na_x[Mn_{1-y}M_y]O_2$ Positive electrodes and half-cells were obtained in the same manner as in Battery Preparation Example 1, except that any of the orthorhombic $Na_x[Mn_{1-y}M_y]O_2$ powder prepared in the Active Material Preparation Examples 9 to 27 instead of the orthorhombic $Na_{0.7}MnO_2$ powder prepared in the Active Material Preparation Example 1 was used.

Battery Comparative Example 1: Preparation of Half-Cell Having Positive Electrode Using Hexagonal $Na_{0.7}MnO_2$ Positive electrode and half-cell were obtained in the same manner as in Battery Preparation Example 1, except that the hexagonal $Na_{0.7}MnO_2$ powder prepared in the Active Material Comparative Example 1 instead of the $Na_{0.7}MnO_2$ powder prepared in the Active Material Preparation Example 1 was used.

Battery Comparative Example 2: Preparation of Half-Cell Having Positive Electrode Using Hexagonal $Na_{0.7}(Mn_{0.75}Fe_{0.25})O_2$ Positive electrode and half-cell was obtained in the same manner as in Battery Preparation Example 1, except that the hexagonal $Na_{0.7}(Mn_{0.75}Fe_{0.25})O_2$ powder prepared in the Active Material Comparative Example 3 instead of the $Na_{0.7}MnO_2$ powder prepared in the Active Material Preparation Example 1 was used.

Battery Comparative Example 3: Preparation of Half-Cell Having Positive Electrode Using Hexagonal $Na_{0.7}(Mn_{0.5}Fe_{0.5})O_2$ Positive electrode and half-cell was obtained in the same manner as in Battery Preparation Example 1, except that the hexagonal $Na_{0.7}(Mn_{0.5}Fe_{0.5})O_2$ powder prepared in the Active Material Comparative Example 4 instead of the $Na_{0.7}MnO_2$ powder prepared in the Active Material Preparation Example 1 was used.

FIG. 26A, FIG. 26B, FIG. 26C, and FIG. 26D are graphs showing the charge-discharge characteristics of the half-cells according to the Battery Preparation Example 1 and the Battery Comparative Examples 1 to 3, respectively. Here, constant current charging was performed at a rate of 20 mA/g up to 4.3 V, and discharging was performed at a rate equal to the charging rate to 1.5 V with constant current discharge. Charging and discharging proceeded for 2 cycles.

Referring to FIGS. 26A, 26B, 26C and 26D, in comparation with the half-cells prepared using $Na_{0.7}MnO_2$ (Battery Comparative Example 1, FIG. 26B), $Na_{0.7}(Mn_{0.75}Fe_{0.25})O_2$ (Battery Comparative Example 2, FIG. 26C), and $Na_{0.7}(Mn_{0.5}Fe_{0.5})O_2$ (Battery Comparative Example 3, FIG. 26D) having hexagonal crystal structure, the half-cell prepared using $Na_{0.7}MnO_2$ having orthorhombic crystal structure (Battery Preparation Example 1, FIG. 26A) shows excellent discharge capacity exceeding 200 mAhg$^{-1}$.

FIG. 27A and FIG. 27B are graphs showing the charge-discharge characteristics and the discharge capacity according to the number of cycles of the half-cell according to the Battery Preparation Example 1, respectively. Here, constant current charging was performed at a rate of 20 mAg$^{-1}$ up to 4.3 V, and discharging was performed at a rate equal to the charging rate down to 1.5 V with constant current discharge. Charging and discharging proceeded for 25 cycles.

Referring to FIGS. 27A and 27B, it can be seen that, when a half-cell is manufactured using Na$_{0.7}$MnO$_2$ having an orthorhombic crystal structure, the discharge capacity is not significantly decreased even at increased number of cycles (about 90% in 25 cycles), which means capacity retention rate and stability are excellent. As described above, it is considered that the improvement of the discharge capacity retention is based on that Na$_{0.7}$MnO$_2$ having the structure of the orthorhombic structure and having the space group of Cmcm is used as the positive electrode active material and has a stable crystal structure.

FIGS. 28 to 46 are graphs showing the charge-discharge characteristics of the half-cells according to the Battery Preparation Examples 2 to 20, respectively. Here, constant current charging was performed at a rate of 20 mAg$^{-1}$ up to 4.3 V, and discharging was performed at a rate equal to the charging rate down to 1.5 V with constant current discharge. Charging and discharging proceeded for 2 cycles.

Referring to FIGS. 28 to 46, it can be seen that the half-cells fabricated using Na$_x$[Mn$_{1-y}$M$_y$]O$_2$ having the orthorhombic crystal structure can operate properly. In particular, when M is Al, Co, Cd, Nd, Rh, Sc, or Zn in Na$_x$[Mn$_{1-y}$M$_y$]O$_2$, the half-cells show the discharge capacity of 150 mAhg$^{-1}$ or more. Further, when M is Fe and Ni in Na$_x$[Mn$_{1-y}$M$_y$]O$_2$, the half-cells show excellent discharge capacity higher than 200 mAhg$^{-1}$.

FIG. 47 is a graph showing the discharge capacity according to the number of cycles of the half-cells according to Battery Preparation Examples 1 and 14. Here, constant current charging was performed at a rate of 20 mAg$^{-1}$ up to 4.3 V, and discharging was performed at a rate equal to the charging rate down to 1.5 V with constant current discharge. Charging and discharging proceeded for 50 cycles.

Referring to FIG. 47, in the case of a half-cell according to the Battery Preparation Example 1 using the Na$_{0.7}$MnO$_2$ according to the Active Material Preparation Example 1 as the positive electrode active material, the discharge capacity was 75% of the initial discharge capacity after 50 cycles. However, in the case of the half-cell according to the Battery Preparation Example 14 using the Na$_{0.7}$(Mn$_{0.95}$Ni$_{0.05}$)O$_2$ according to the Active Material Preparation Example 21 as the positive electrode active material, the discharge capacity was 92% of the initial discharge capacity after 50 cycles, indicating that the lifetime characteristics are further improved.

FIG. 48 shows an in-situ synchrotron XRD graph of the positive electrode active materials during the initial cycle of the half-cells according to the Battery Preparation Examples 1 and 14. Here, charging and discharging were performed at a voltage range of 1.5 to 4.3 V and a constant current of 20 mAg$^{-1}$.

Referring to FIG. 48, in both cases of the half-cell according to the Battery Preparation Example 1 using the Na$_{0.7}$MnO$_2$ according to the Active Material Preparation Example 1 as the positive electrode active material and the half-cell according to the Battery Preparation Example 14 using the Na$_{0.7}$(Mn$_{0.95}$Ni$_{0.05}$)O$_2$ according to the Active Material Preparation Example 21 as the positive electrode active material, the positive electrode materials showed a phase change to the OP4 structure (space group: P-6m2) during the charging process, and reversible phase change back to the orthorhombic structure in the discharge process.

Meanwhile, in case of Na$_{0.7}$(Mn$_{0.95}$Ni$_{0.05}$)O$_2$, a superstructure or superlattice was observed in the 2θ region between 15.6 and 16 degrees.

FIGS. 49A-49B shows show in-situ high temperature XRD graph of the positive electrode active materials when the half-cells according to the Battery Preparation Examples 1 and 14 are in a charged state. Here, the half-cells were charged at a constant current of 20 mAg$^{-1}$ up to the voltage of 4.3 V (sodium was released from the positive electrode active material), and XRD data was obtained while raising the temperature from room temperature to 600° C. and at room temperature.

Referring to FIGS. 49A-49B, in both cases of the half-cell according to the Battery Preparation Example 1 using the Na$_{0.7}$MnO$_2$ according to the Active Material Preparation Example 1 as the positive electrode active material and the half-cell according to the Battery Preparation Example 14 using the Na$_{0.7}$(Mn$_{0.95}$Ni$_{0.05}$)O$_2$ according to the Active Material Preparation Example 21 as the positive electrode active material, the positive electrode materials showed peaks representing OP4 structure (main) and the orthorhombic structure. Further, at a temperature range of 100 to 150° C., the strength of the hydrate peak due to water or moisture in the atmosphere was all reduced, which means that the water or moisture was evaporated. In the high temperature region, manganese oxide is observed due to the evaporation of sodium and oxygen. The manganese oxide is present mainly in MnO$_2$, and the major oxidation number of Mn can be deduced as tetravalent.

Meanwhile, in case of Na$_{0.7}$(Mn$_{0.95}$Ni$_{0.05}$)O$_2$, a superstructure or superlattice was observed in the 2θ region between 15.6 and 16 degrees.

Battery Preparation Example 25: Preparation of Half-Cell Having Positive Electrode Using Orthorhombic Na$_{0.7}$(Mn$_{0.95}$Ni$_{0.05}$)O$_2$ and Additives The orthorhombic Na$_{0.7}$(Mn$_{0.95}$Ni$_{0.05}$)O$_2$ powder prepared in Active Material Preparation Example 21, additive (NaNO$_2$), conductive material (Super-P, KS-6), and binder (polyvinylidene fluoride) were mixed in an organic solvent (N-Methyl-2-Pyrrolidone, NMP) at a weight ratio of 85:6:4.5:4.5. Thereafter, it was coated on an aluminum current collector and pressed to form the positive electrode.

Thereafter, metal sodium was used as a negative electrode, a glass filter was used as a separator, and a nonaqueous electrolyte solution containing NaPF$_6$ as an electrolyte and organic solvent including propylene carbonate (PC, 98 vol. %) and fluoroethylene carbonate (FEC, 2 vol. %) to prepare the half-cell.

Battery Preparation Example 26: Preparation of Half-Cell Having Positive Electrode Using Hexagonal Na$_{0.7}$[Mn$_{0.7}$Fe$_{0.3}$]O$_2$ and Additive Positive electrode and half-cell were obtained in the same manner as in Battery Preparation Example 25, except that hexagonal Na$_{0.7}$[Mn$_{0.7}$Fe$_{0.3}$]O$_2$ powder instead of the orthorhombic Na$_{0.7}$(Mn$_{0.95}$Ni$_{0.05}$)O$_2$ powder prepared in the Active Material Preparation Example 21 was used. The hexagonal Na$_{0.7}$[Mn$_{0.7}$Fe$_{0.3}$]O$_2$ powder prepared using the same method in the Active Material Comparative Example 3 except that the number of moles of manganese salt and iron salt.

Full-Cell Preparation Example

Full-cell was obtained in the same manner as in Battery Preparation Example 25, except that hard carbon as a negative electrode active material, carbon black as a conductive material, and PVdF as a binder were mixed in NMP at a weight ratio of 70:15:15 and coated on a copper foil as a current collector and then dried to obtain a negative electrode instead of using metallic sodium as the negative electrode.

FIG. 50A is a graph showing the charging and discharging characteristics of the half-cell according to the Battery Preparation Example 25, and FIG. 50B is a graph showing the discharging capacity according to the number of cycles of the half-cell according to the Battery Preparation Example 25. FIG. 51A is a graph showing the charging and discharging characteristics of the half-cell according to the Battery Preparation Example 26, and FIG. 51B is a graph showing the discharging capacity according to the number of cycles of the half-cell according to the Battery Preparation Example 26. Here, constant current charging was performed at a rate of 20 mA/g up to 4.3 V, and discharge was performed at a rate equal to the charging rate down to 1.5 V with constant current discharge. Charging and discharging proceeded for 2 cycles.

Table 2 summarizes the initial charging capacity and the initial discharging capacity of the half-cell according to Battery Preparation Examples 14, 24, 25 and 26.

TABLE 2

| | Active Material | Additive | charge capacity (mAh) | discharge capacity (mAh) |
|---|---|---|---|---|
| Battery Preparation Example 14 | orthorhombic | — | 0.263 | 0.351 |
| Battery Preparation Example 25 | $Na_{0.7}(Mn_{0.95}Ni_{0.05})O_2$ | $NaNO_2$ | 0.362 | 0.361 |
| Battery Preparation Example 24 | hexagonal | — | 0.166 | 0.204 |
| Battery Preparation Example 26 | $Na_{0.7}[Mn_{0.7}Fe_{0.3}]O_2$ | $NaNO_2$ | 0.234 | 0.223 |

Referring to FIGS. 50A, 50B, 51A, and 51B and Table 2, the half-cell according to the Battery Preparation Example 24 is obtained in the same manner as in Battery Preparation Example 14, except that hexagonal $Na_{0.7}[Mn_{0.7}Fe_{0.3}]O_2$ powder instead of the orthorhombic $Na_{0.7}(Mn_{0.95}Ni_{0.05})O_2$ powder was used. When $NaNO_2$ as an additive is added to the positive electrode, both of the battery having the orthorhombic $Na_{0.7}(Mn_{0.95}Ni_{0.05})O_2$ according to Active Material Preparation Example 21 as a positive electrode active material and the battery having hexagonal $Na_{0.7}[Mn_{0.7}Fe_{0.3}]O_2$ as a positive electrode active material show large increase in the initial charge capacity with slightly increase in the initial discharge capacity. It was assumed that $NaNO_2$, which is an additive, served as a source of $Na^+$ ions during the charging process. In particular, when orthorhombic $Na_{0.7}(Mn_{0.95}Ni_{0.05})O_2$ was used as the positive electrode active material and the additive was added, the initial charge capacity was 0.362 mAh, which was much higher than that of the sodium secondary battery using the positive electrode active material of the general P2 structure.

In addition, it can be seen that the life characteristics are further improved when the additive is used as compared with the case where the additive is not used.

FIG. 52A is a graph showing charge and discharge characteristics of the full-cell according to the Full-cell Preparation Example, and FIG. 52B is a graph showing a discharge capacity according to the number of cycles of the full-cell according to the Full-cell Preparation Example.

Referring to FIGS. 52A and 52B, when the full-cell having the positive electrode comprising the orthorhombic $Na_{0.7}(Mn_{0.95}Ni_{0.05})O_2$ according to Active Material Preparation Example 21 as a positive electrode active material and the additive, it was found that the initial charge capacity was about 0.362 mAh, which was significantly improved as compared with the sodium secondary battery using the positive electrode active material of the general P2 structure, and the lifetime characteristics were improved.

The present invention has been described in detail with reference to exemplary embodiments, but the present invention is not limited by the above-described exemplary embodiments, and may be implemented in various modifications and changes by those of ordinary skill in the art within the technical idea and scope of the present invention.

The invention claimed is:

1. An electrode active material of the following Chemical Formula 1, having an orthorhombic crystal system, and a space group of Cmcm:

$$Na_x[Mn_{1-y-z}M^1_yM^2_z]O_{2-\alpha}A_\alpha \qquad \text{[Chemical Formula 1]}$$

in Chemical Formula 1,
x is 0.5 to 0.8,
$M^1$ and $M^2$ are, regardless of each other, Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi,
y is from 0 to 0.25,
z is from 0 to 0.25,
A is N, O, F, or S, and
α is 0 to 0.1,
wherein, in an XRD graph of the electrode active material having the orthorhombic crystal system and the space group of Cmcm, a first peak representing a (002) plane exhibits an intensity of 5 to 8.5 times a second peak representing a (004) plane.

2. The electrode active material of claim 1, wherein the electrode active material of the Chemical Formula 1 has the following Chemical Formula 2:

$$Na_x[Mn_{1-y}M_y]O_{2-\alpha}A_\alpha \qquad \text{[Chemical Formula 2]}$$

in Chemical Formula 2,
x is 0.5 to 0.8,
M is Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi,
y is from 0 to 0.25,
A is N, O, F, or S, and
α is 0 to 0.1.

3. The electrode active material of claim 2, wherein y is 0.025 to 0.1.

4. The electrode active material of claim 2, wherein M is Al, Co, Cd, Nd, Rh, Sc, Zn, Fe, or Ni.

5. The electrode active material of claim 4, wherein M is Fe or Ni.

6. The electrode active material of claim 1, wherein the electrode active material of the Chemical Formula 1 has the following Chemical Formula 3:

$$Na_xMnO_2 \text{ (x is 0.5 to 0.8)} \qquad \text{[Chemical Formula 3]}.$$

7. The electrode active material of claim 1, wherein the electrode active material of the Chemical Formula 1 has the following Chemical Formula 4:

$$Na_x[Mn_{1-y}M_y]O_2 \quad \text{[Chemical Formula 4]}$$

in Chemical Formula 4, x is 0.5 to 0.8,

M is Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi, y is from 0.02 to 0.25.

8. The electrode active material of claim 1, wherein x is 0.65 to 0.75.

9. The electrode active material of claim 1, wherein the electrode active material of the Chemical Formula 1 is $Na_{0.7}MnO_2$.

10. An electrode active material of the following Chemical Formula 1, having an orthorhombic crystal system, and a space group of Cmcm:

$$Na_x[Mn_{1-y-z}M^1_yM^2_z]O_{2-\alpha}A_\alpha \quad \text{[Chemical Formula 1]}$$

in Chemical Formula 1, x is 0.5 to 0.8, $M^1$ and $M^2$ are, regardless of each other, Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi, y is from 0 to 0.25, z is from 0 to 0.25, A is N, O, F, or S, and $\alpha$ is 0 to 0.1, wherein, in an XRD graph of the electrode active material, a half width of a first peak representing a (002) plane is 0.2 to 0.3.

11. A method of preparing an electrode active material, comprising:

preparing a metal salt solution containing a sodium salt and a manganese salt;

subjecting the metal salt solution to ultrasonic spray pyrolysis to obtain a solid powder; and heat-treating the solid powder to obtain the electrode active material of the following Chemical Formula 1, having an orthorhombic crystal system and a space group of Cmcm:

$$Na_x[Mn_{1-y-z}M^1_yM^2_z]O_{2-\alpha}A_\alpha \quad \text{[Chemical Formula 1]}$$

in Chemical Formula 1, x is 0.5 to 0.8, $M^1$ and $M^2$ are, regardless of each other, Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi, y is from 0 to 0.25, z is from 0 to 0.25, A is N, O, F, or S, and $\alpha$ is 0 to 0.1.

12. The method of claim 11, wherein the heat treatment is performed at 1100° C. to 1300° C.

13. The method of claim 11, wherein the heat treatment is performed in an atmosphere containing oxygen of 15 vol. % to 100 vol. % and a remainder of inert gas.

14. The method of claim 13, wherein the atmosphere is a dry atmosphere.

15. The method of claim 13, wherein the inert gas is nitrogen.

16. A secondary battery comprising:

a positive electrode including a positive electrode active material of the following Chemical Formula 1, having an orthorhombic crystal system and a space group of Cmcm;

a negative electrode including a negative electrode active material; and an electrolyte disposed between the positive electrode and the negative electrode:

$$Na_x[Mn_{1-y-z}M^1_yM^2_z]O_{2-\alpha}A_\alpha \quad \text{[Chemical Formula 1]}$$

in Chemical Formula 1, x is 0.5 to 0.8, $M^1$ and $M^2$ are, regardless of each other, Sc, Ti, V, Cr, Mn, Fe, Co, Ni, Cu, Zn, Y, Zr, Nd, Mo, Tc, Ru, Rh, Pd, Pb, Ag, Cd, Al, Ga, In, Sn, or Bi, y is from 0 to 0.25, z is from 0 to 0.25, A is N, O, F, or S, and $\alpha$ is 0 to 0.1, wherein the positive electrode further includes sodium salt.

17. The secondary battery of claim 16, wherein the sodium salt is $NaNO_2$.

18. The secondary battery of claim 17, wherein the $NaNO_2$ is in an amount of 3 to 20 parts by weight based on 100 parts by weight of the positive electrode active material.

* * * * *